US011974318B2

(12) United States Patent
Chisci et al.

(10) Patent No.: US 11,974,318 B2
(45) Date of Patent: Apr. 30, 2024

(54) CONTENTION CREDIT-BASED LISTEN-BEFORE-TALK (LBT)

(71) Applicant: QUALCOMM INCORPORATED, San Diego, CA (US)

(72) Inventors: Giovanni Chisci, San Diego, CA (US); Yisheng Xue, San Diego, CA (US); Jing Sun, San Diego, CA (US); Arumugam Chendamarai Kannan, San Diego, CA (US); Vinay Chande, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/249,250

(22) Filed: Feb. 24, 2021

(65) Prior Publication Data

US 2022/0272750 A1 Aug. 25, 2022

(51) Int. Cl.

| | |
|---|---|
| ***H04W 74/02*** | (2009.01) |
| ***H04W 16/14*** | (2009.01) |
| ***H04W 72/0446*** | (2023.01) |

(52) U.S. Cl.

CPC .......... *H04W 74/02* (2013.01); *H04W 16/14* (2013.01); *H04W 72/0446* (2013.01)

(58) Field of Classification Search

CPC . H04W 74/02; H04W 16/14; H04W 72/0446; H04W 74/0808

See application file for complete search history.

(56) References Cited

U.S. PATENT DOCUMENTS

| | | | | |
|---|---|---|---|---|
| 7,817,575 | B2 * | 10/2010 | Zhu | H04W 74/085 370/252 |
| 2020/0021423 | A1 * | 1/2020 | Liu | H04L 27/2602 |
| 2021/0153245 | A1 * | 5/2021 | Tooher | H04W 74/008 |
| 2021/0298045 | A1 * | 9/2021 | Kim | H04W 72/0453 |
| 2022/0070698 | A1 * | 3/2022 | Jiang | H04W 24/04 |
| 2022/0078873 | A1 * | 3/2022 | Belleschi | H04W 28/24 |
| 2022/0272750 | A1 * | 8/2022 | Chisci | H04W 72/0446 |
| 2023/0155659 | A1 * | 5/2023 | Ganesan | H04W 24/02 370/329 |

* cited by examiner

*Primary Examiner* — Benjamin H Elliott, IV
(74) *Attorney, Agent, or Firm* — QUALCOMM Incorporated

(57) ABSTRACT

Wireless communications systems and methods related to performing contention credit-based listen-before-talk (LBT) for communications over a shared radio frequency band (e.g., in a shared spectrum or in an unlicensed spectrum) are provided. A wireless communication device performs a first clear channel assessment (CCA) including a first countdown. The wireless communication device transmits, after a gap period from the first countdown, a first communication signal. The wireless communication device performs a second CCA including a second countdown. The wireless communication device transmits, beginning before an end of the second countdown, a second communication signal based on at least a first contention credit associated with the gap period.

26 Claims, 12 Drawing Sheets

1000
Perform CCA for each contention slot in gap period 1010
1020 CCA successful? No / Yes
Accumulate contention credit 1030
1040 CAT2 LBT start? No / Yes
1050 Perform CAT2 LBT
1060 CAT2 LBT pass? No / Yes
1090 Discard accumulated contention credits
1070 Add accumulated contention credits to contention credit pool
1080 Add additional contention credits to contention credit pool based on a duration of the CAT2 LBT 115i
115j
115k
115h
115g
XXX
105e
115f
105f
100
115e 105d
105b
115b
115d
115c
115a
105a
105c

CONTENTION CREDIT-BASED LISTEN-BEFORE-TALK (LBT)

TECHNICAL FIELD

This application relates to wireless communication systems, and more particularly to performing contention credit-based listen-before-talk (LBT) for communications over a shared radio frequency band (e.g., in a shared spectrum or in an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and diverse deployment scenarios continue to expand in wireless communication, spectrum sharing technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a wireless communication device, the method includes performing a first clear channel assessment (CCA) including a first countdown; transmitting, after a gap period from the first countdown, a first communication signal; performing a second CCA including a second countdown; and transmitting, beginning before an end of the second countdown, a second communication signal based on at least a first contention credit associated with the gap period.

In an additional aspect of the disclosure, a wireless communication device includes a processor configured to perform a first clear channel assessment (CCA) including a first countdown; and performing a second CCA including a second countdown; and a transceiver coupled to the processor, where the transceiver is configured to transmit, after a gap period from the first countdown, a first communication signal; and transmit, beginning before an end of the second countdown, a second communication signal based on at least a first contention credit associated with the gap period.

In an additional aspect of the disclosure, a non-transitory computer-readable medium having program code recorded thereon, the program code includes code for causing a wireless communication device to perform a first clear channel assessment (CCA) including a first countdown; code for causing the wireless communication device to transmit, after a gap period from the first countdown, a first communication signal; code for causing the wireless communication device to perform a second CCA including a second countdown; and code for causing the wireless communication device to transmit, beginning before an end of the second countdown, a second communication signal based on at least a first contention credit associated with the gap period.

In an additional aspect of the disclosure, a wireless communication device includes means for performing a first clear channel assessment (CCA) including a first countdown; means for transmitting, after a gap period from the first countdown, a first communication signal; means for performing a second CCA including a second countdown; and means for transmitting, beginning before an end of the second countdown, a second communication signal based on at least a first contention credit associated with the gap period.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
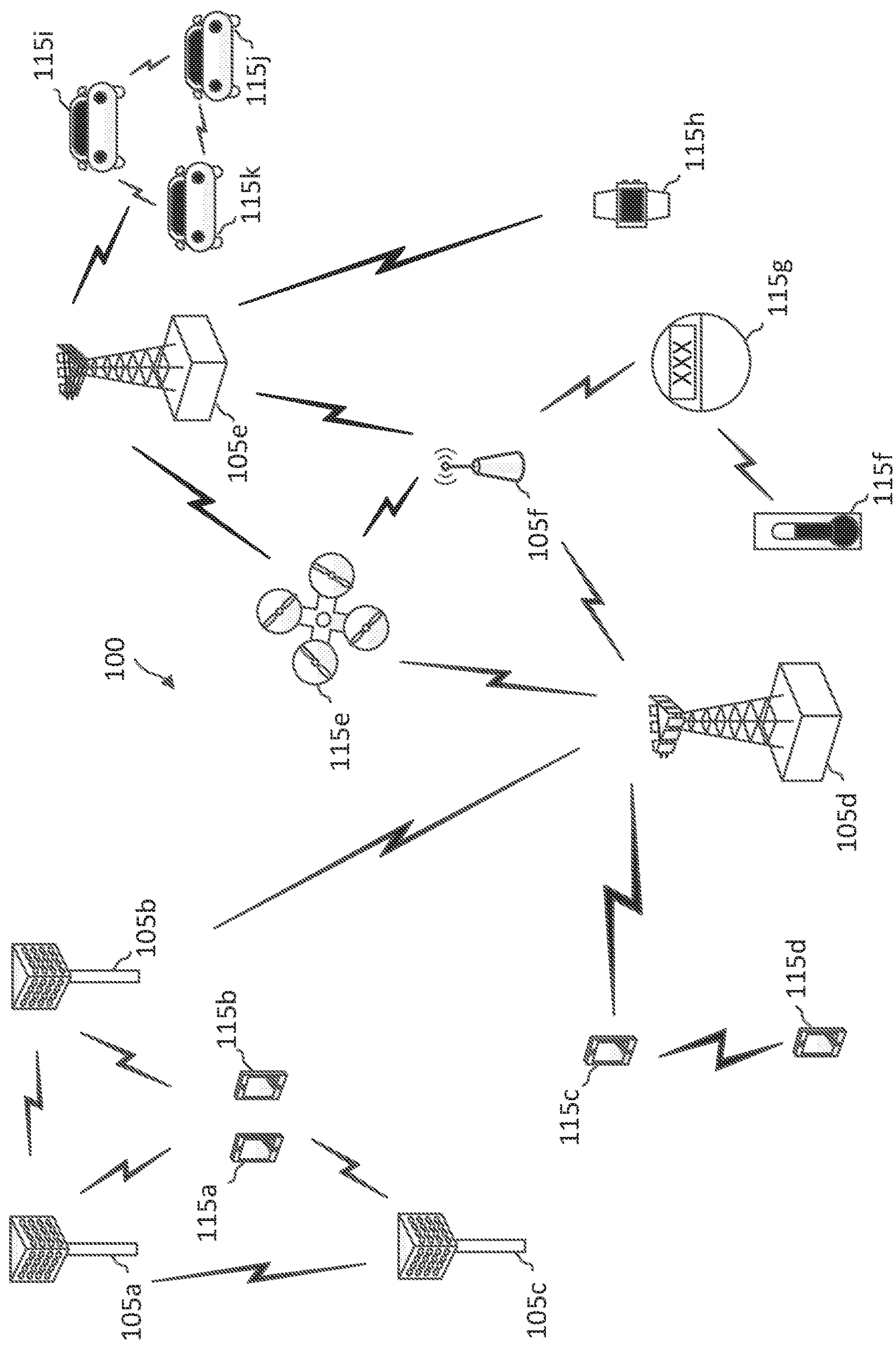
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms “networks” and “systems” may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named “3rd Generation Partnership Project” (3GPP), and cdma2000 is described in documents from an organization named “3rd Generation Partnership Project 2” (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 frequency bands at 7 GHz or lower (e.g., between about 410 MHz to about 7125 MHz). FR2 bands includes frequency bands in mmWave ranges between about 24.25 GHz and about 52.6 GHz. The mmWave bands have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Channel access in an unlicensed band may be regulated by regulations. For instance, some regulations may mandate a certain channel access scheme, such as listen-before-talk (LBT), for sharing an unlicensed band. In particular, a transmitting node (e.g., a base station (BS) or a user equipment (UE)) may employ an LBT procedure to contend for a transmission opportunity (TXOP) in the shared channel. When the LBT results in an LBT pass or success (the transmitting node wins contention for the wireless medium), the wireless communication device may access the shared channel to transmit data. When the LBT fails, the transmitting node may refrain from transmitting in the shared channel. In an example, the LBT may be based on energy detection. For instance, the LBT results in a pass or success when signal energy measured from the channel is below an energy detection (ED) threshold. Conversely, the LBT results in a failure when signal energy measured from the channel exceeds the ED threshold. In another example, the LBT may be based on signal detection. For example, the LBT results in a pass or success when a channel reservation signal (e.g., a predetermined preamble signal) is not detected in the channel. Conversely, the LBT results in a failure when a channel reservation signal is detected in the channel. A TXOP may also be referred to as channel occupancy time (COT). An LBT may also be referred to as a clear channel assessment (CCA).

As used herein, the terms "LBT pass," "LBT success," "CCA pass," and/or "CCA success" may refer to a clearance for transmission in a shared channel or a wireless communication device winning a contention in the shared channel, where the clearance may be based on a received signal measurement of the channel being below an ED threshold or the lack of a channel reservation signal present in the shared channel. Conversely, the terms "LBT failure," and/or "CCA failure" may refer to a failure in obtaining a clearance for transmission in a shared channel (e.g., the channel is busy or occupied) or a wireless communication device failing to win a contention in the shared channel, where the detection of the LBT or CCA failure is based on a received signal measurement of the channel being above an ED threshold or the presence of a channel reservation signal present in the channel.

An LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number R and backoff for R number of contention slots or CCA slots. The transmitting node may transmit in the channel after the random backoff if the channel remains clear (idle) during each of the contention slots or CCA slots. The random backoff may also be referred to as countdown Further, LBT can be used for asynchronous channel access or synchronous channel access. In an asynchronous channel access system, such as a IEEE 802.11 (WiFi) system, a wireless communication device or WiFi device may access the channel at any time. In other words, a WiFi device may perform an LBT to contend for a TXOP or COT at any time and may start a transmission upon wining the contention, for example, as soon as completing a successful LBT. On the other hand, in a synchronous channel access system, such as NR-unlicensed (NR-U), a wireless communication device (e.g., a BS or a UE) may access the channel at fixed time instants (e.g., periodic time instants). In particular, all transmissions in NR-U are to start at a slot boundary. Thus, while an NR-U device (e.g., a BS or a UE) may perform an LBT and win the contention, the NR-U device may or may not start a transmission immediately upon winning the contention depending on the LBT completion time. For example, when the LBT completes at a point of time within a slot, the NR-U device may not start a transmission immediately. Instead, the NR-U device may wait till a next slot boundary to start the transmission. Accordingly, there can be a transmission gap (a silence period) between the completion of the LBT and the start of the transmission.

Leaving a transmission gap (a silence period) between the completion of an LBT and the start of a transmission can be problematic when the synchronous channel access system shares a spectrum with an asynchronous channel access system. For instance, an asynchronous channel access device (e.g., WiFi device) may also be performing an LBT to contend for a TXOP in the channel at the same time as the NR-U device. The asynchronous channel access device may complete its LBT (with an LBT pass) during the gap period. Since the asynchronous channel access device can start a transmission at any time, the asynchronous channel access device may start to transmit as soon as the LBT passes. If the NR-U device simply leaves the gap silent without continuing to listen to the channel and starts the transmission at the next slot boundary, the transmission from the NR-U device may collide with the transmission from the asynchronous channel access device.

A first approach to avoid such a collision is for the NR-U device to continue to listen to the channel during the gap period. However, this will cause the NR-U device to the loose the channel access opportunity or TXOP since the NR-U device will detect the transmission from the asynchronous channel access device in the gap period and refrain from transmitting in the channel. A second approach to avoid such a collision is for the NR-U device to stop listening to the channel during the gap period, but to perform an additional one-shot receive signal measurement (e.g., a CAT2 LBT) in the channel at the end of the gap period (e.g., just before transmitting the transmissions at the start of the slot boundary). However, the NR-U device may again detect the transmission from the asynchronous channel access device (e.g., with the received signal measurement being above an ED threshold) and refrain from transmitting in the channel as in the first approach. Thus, in both the first and second approaches, when the NR-U device does not transmit as permitted by the LBT and continue to listen to the channel during the gap period or perform a one-shot receive signal measurement at the end of the gap period, the NR-U device can be blocked by the asynchronous channel access device from accessing the channel. Further, since the asynchronous channel access device can start a transmission at any time, once the asynchronous channel access device gain access to the channel, the asynchronous channel access device may continue to gain access to the channel while the NR-U device is waiting for a slot boundary to start a transmission. In other words, the asynchronous channel access device may have a greater number of opportunities in accessing the channel or winning a contention, causing the NR-U system to be starved of transmission opportunities.

To mitigate starvation of channel access by devices (e.g., NR-U devices) with synchronous channel access that are coexisting with devices (e.g., WiFi devices) with asynchronous channel access, the NR-U devices may apply cyclic prefix (CP) extensions. In this regard, upon completing an LBT and winning a contention, an NR-U device may apply a CP extension to occupy the channel before the actual transmission (that carries information data). However, CP extension is limited to be less than a symbol time. For instance, in OFDM transmissions, each OFDM symbol includes a CP portion followed by a data portion. A CP extension may refer to extending the CP portion into a period immediately preceding the OFDM symbol. In other words, a CP may start at an earlier time than the start of an OFDM symbol. Thus, depending on the LBT completion time, the CP extension technique may or may not be sufficient in blocking another device from accessing the channel until the start of the transmission (that carries information data). As an example, if an LBT completes within a symbol immediately preceding a slot boundary, the CP extension may operate well in blocking another device from accessing the channel. If, however, the LBT completes within a symbol much earlier than a slot boundary (e.g., about 2, 3 or 4 symbols before a slot boundary), the CP extension may not be used to block another device from accessing the channel.

Another approach for mitigating channel access starvation for NR-U devices is to utilize mini-slot-based transmissions. In particular, mini-slot-based transmissions may have a finer starting time granularity than slot-based transmissions. For example, a slot may include about 14 symbols, and a mini-slot may include about 1, 2, 3, or 7 symbols. As such, an LBT may potentially complete (with a contention win) at a point of time closer to a transmission starting point that is based on a mini-slot boundary than a transmission starting point that is based on a slot boundary. Thus, the use of mini-slot-based transmission can reduce the duration of a gap between an LBT completion and the start of a transmission, and may in turn reduce opportunities for another device to "jump in" and access the channel during the gap. However, mini-slot-based transmissions may increase the complexity at a receiving device. For instance, a receiving device may have to perform more frequent monitoring for mini-slot-based transmissions (e.g., at every mini-slot boundary, which may be as often as every 1, 2, 3, or 5 symbols) than for slot-based transmissions. The frequent monitoring can be costly in terms of processing and power consumption. As such, mini-slot-based transmissions may not be suitable or desirable for low-cost devices, such as reduced capability UEs that have limited processing and/or power capabilities. Further, mini-slot-based transmissions may not be supported for all types of communications. For instance, mini-slot-based transmissions are not supported for sidelink communication where UEs communicate with each other without tunneling through a BS and/or a core network. Accordingly, improvements for mitigating channel access starvation for devices with synchronous channel access may beneficial.

The present disclosure describes mechanisms for improving medium utilization fairness for devices operating in a synchronous channel access mode with fixed transmission starting points (e.g., at slot boundaries). In particular, a wireless communication device operating in a synchronous channel access mode is allowed to accumulate contention credit(s) when the wireless communication device does not start a transmission as permitted by an LBT. Additionally, the wireless communication device is allowed to utilize the contention credit(s) in a subsequent LBT by shortening an LBT duration (a countdown duration). For example, the wireless communication device may perform a first CCA including a first countdown (e.g., a random backoff associated with a CAT4 LBT). In some aspects, the wireless communication device may perform the first CCA based on energy detection. The wireless communication device may transmit a first communication signal after a gap period from the first countdown. For instance, the wireless communication device successfully completes the first countdown (e.g., with receive channel signal measurements below a threshold) within a slot and waits till the next available transmission starting point (e.g., a next slot boundary) to start the transmission for the first communication signal.

In some aspects, the wireless communication device may add one or more contention credits to a contention credit pool based on the gap period. In some aspects, the wireless communication device may continue to perform the first CCA during the gap period after successfully completing the first countdown. More specifically, the wireless communication device may perform a CCA in each CCA slot within the gap period, and may add one contention credit to the contention credit pool for each CCA with a successful CCA in the gap period. In some aspects, the contention credit pool may have a maximum size (a maximum number of contention credits) and the wireless communication device may not add more contention credit(s) to the contention credit pool if the contention credit pool is full (already holding the maximum number of contention credits).

In some aspects, as part of performing the first CCA, the wireless communication device may perform a CAT2 LBT at the end of the gap period. The wireless communication device may transmit the first communication signal further based on the CAT2 LBT being successful (e.g., with a received channel signal measurement below an ED threshold). In one aspect, the wireless communication device may determine how many CCA slots does the gap period correspond to, and may add one contention credit to the contention credit pool for each CCA slot in the gap period without performing an CCA in the CCA slot. Further, in some aspects, the wireless communication device may add the one or more contention credits to the contention credit pool further based on the CAT2 LBT being successful. In another aspect, the wireless communication device may continue to perform the first CCA during the gap period after successfully completing the first countdown until the start of the CAT2 LBT. More specifically, the wireless communication device may perform a CCA in each CCA slot within the gap period, for example, by determining a signal measurement from a signal received from the channel and comparing the received signal measurement to an ED threshold. The wireless communication device may add one contention credit to the contention credit pool for each CCA slot with a successful CCA in the gap period. Further, in some aspects, the wireless communication device may add the one or more contention credits to the contention credit pool further based on the CAT2 LBT being successful.

At a later time, the wireless communication device may perform a second CCA including a second countdown (e.g., a random backoff associated with another CAT4 LBT). The wireless communication device may transmit a second communication signal before an end of the second countdown based on at least a first contention credit of the one or more contention credits in the contention credit pool. More specifically, the wireless communication device may reduce the second countdown by one or more CCA slots, where a quantity of the one or more CCA slots is based on a quantity of contention credits available in the contention credit pool.

The wireless communication device may determine a quantity of contention credit(s) for reducing the second countdown in a variety of ways. In some aspects, the quantity of the one or more CCA slots may correspond to all contention credits available in the contention credit pool. In other words, the wireless communication device may utilize all available contention credits in the contention credit pool to reduce the second countdown. In some aspects, the quantity of the one or more CCA slots for reducing the second countdown is further based on a threshold. The threshold may be a maximum number of contention credits that the wireless communication device is allowed to utilize per countdown. In some aspects, the quantity of the one or more CCA slots for reducing the second countdown is further based on a number of CCA slots associated with a successful CCA in the second countdown. In other words, the utilization of the contention credits may be in a progressive form. For example, the wireless communication device may utilize a greater number of contention credits when there are a greater number of CCA slots with a successful CCA in the second countdown. In some aspects, the quantity of the one or more CCA slots for reducing the second countdown is further based on a predetermined quantity of CCA slots per contention credit. For instance, for each CCA slot with a successful CCA in the gap period, the wireless communication device may utilize N contention credits for reducing the second countdown. In some aspects, the quantity of the one or more CCA slots for reducing the second countdown is further based on a channel access priority class (CAPC). For instance, the wireless communication device may have traffic of different CAPCs. The wireless communication device may maintain separate independent contention credit pools for different CAPCs. Additionally, different contention credit pools may have independent parametrizations. For instance, each contention credit pool may be associated with a set of parameters, such as a threshold number of contention credits, a predetermine quantity of CCA slots per contention credit, a maximum contention credit pool size, and/or a contention credit lifetime, that are specific to the contention credit pool.

In some instances, the wireless communication device may detect a CCA failure while performing a CCA during the gap period. For instance, the wireless communication device may perform a third CCA including a third countdown. The wireless communication device may successfully complete the third count down. The wireless communication device may continue to perform the third CCA during a second gap period after the third countdown and before the next slot boundary (where the wireless communication device can start a transmission). The wireless communication device may detect a CCA failure in a CCA slot within the second gap period. In one aspect, upon detecting the CCA failure, the wireless communication device may add one second contention credit to the contention credit pool for each CCA slots with a successful CCA in the second gap period before the CCA failure. Thus, a quantity of the one or more second contention credits is based on a number of the CCA slots with the successful CCA. In other words, the wireless communication device may add the one or more second contention credits (based on the CCA slots with the successful CCA before the CCA failure) to the contention credit pool irrespective of detecting the CCA failure in the second gap period. In another aspect, the wireless communication device may refrain, based on the CCA failure, from adding a second contention credit to the contention credit pool. In other words, upon detecting the CCA failure, the wireless communication device may discard any contention credits that were accumulated during the second gap period before the CCA failure.

In some aspects, when the wireless communication device performs a CAT4 LBT and subsequently performs a CAT2 LBT (a final one-shot measurement) at the end of a second gap period after the CAT4 LBT and before a next slot boundary (where the wireless communication device can start a transmission), the wireless communication device may add one or more second contention credits accumulated during the second gap period to the contention credit pool irrespective of whether the CAT2 LBT is successful or not. The one or more second contention credits can be accumulated based on a number of CCA slots within the second gap period without the wireless communication device performing CCA in the CCA slots within the second gap period. Alternatively, the one or more second contention credits can be accumulated based on a number of CCA slots with a successful CCA in the second gap period. In some other aspects, the wireless communication device may add the one or more second contention credits accumulated during the second gap period to the contention credit pool if the CAT2 LBT is successful and may refrain from adding the one or more second contention credits accumulated during the second gap period to the contention credit pool if the CAT2 LBT is unsuccessful.

In some aspects, the wireless communication device may further associate the first contention credit with a timestamp. In some instances, the timestamp may correspond to the time when first contention credit is added to the contention credit pool. In some aspects, the wireless communication device may remove a second contention credit from the contention credit pool based on a timestamp associated with the second contention credit and an allowable lifetime for a contention credit. More specifically, if the second contention credit has been stored in the contention credit pool for a duration longer than the allowable lifetime, the wireless communication device may remove the second contention credit from the contention credit pool.

Aspects of the present disclosure can provide several benefits. For example, by allowing a wireless communication device to accumulate contention credits when the wireless communication device does not start a transmission as permitted by an LBT (e.g., leaving a gap period or silence period until a next allowable transmission starting point) and to utilize one or more of the accumulated contention credits to shorten a countdown for a subsequent LBT can improve fairness in medium sharing for the wireless communication device when coexisting with other devices such as asynchronous channel access-based devices. For instance, when the wireless communication device does not transmit as permitted by an LBT, the wireless communication device is being overly conservative in accessing the channel (e.g., reducing the likelihood of wireless communication device in successfully gaining access to the channel). Thus, the wireless communication device can accumulate contention credit(s) when the wireless communication device is being overly conservative in accessing the channel. When wireless communication device reduces a countdown in a subsequent LBT, the wireless communication device is being more aggressive in accessing the channel (e.g., increase the likelihood of the wireless communication device in successfully gaining access to the channel). Accordingly, accumulation of the contention credit(s) at one CCA and utilization of contention credit(s) at another CCA can average out the likelihood of the wireless communication device in successfully gaining access to the channel. While the present disclosure describes synchronous channel access in the context of NR-U devices having to start a transmission at a slot boundary, the present disclosure may be applied to wireless communication devices of any radio access technologies (RATs) operating in a synchronous channel access mode with fixed and/or periodic transmission starting points.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel as discussed above. In some aspects, a serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
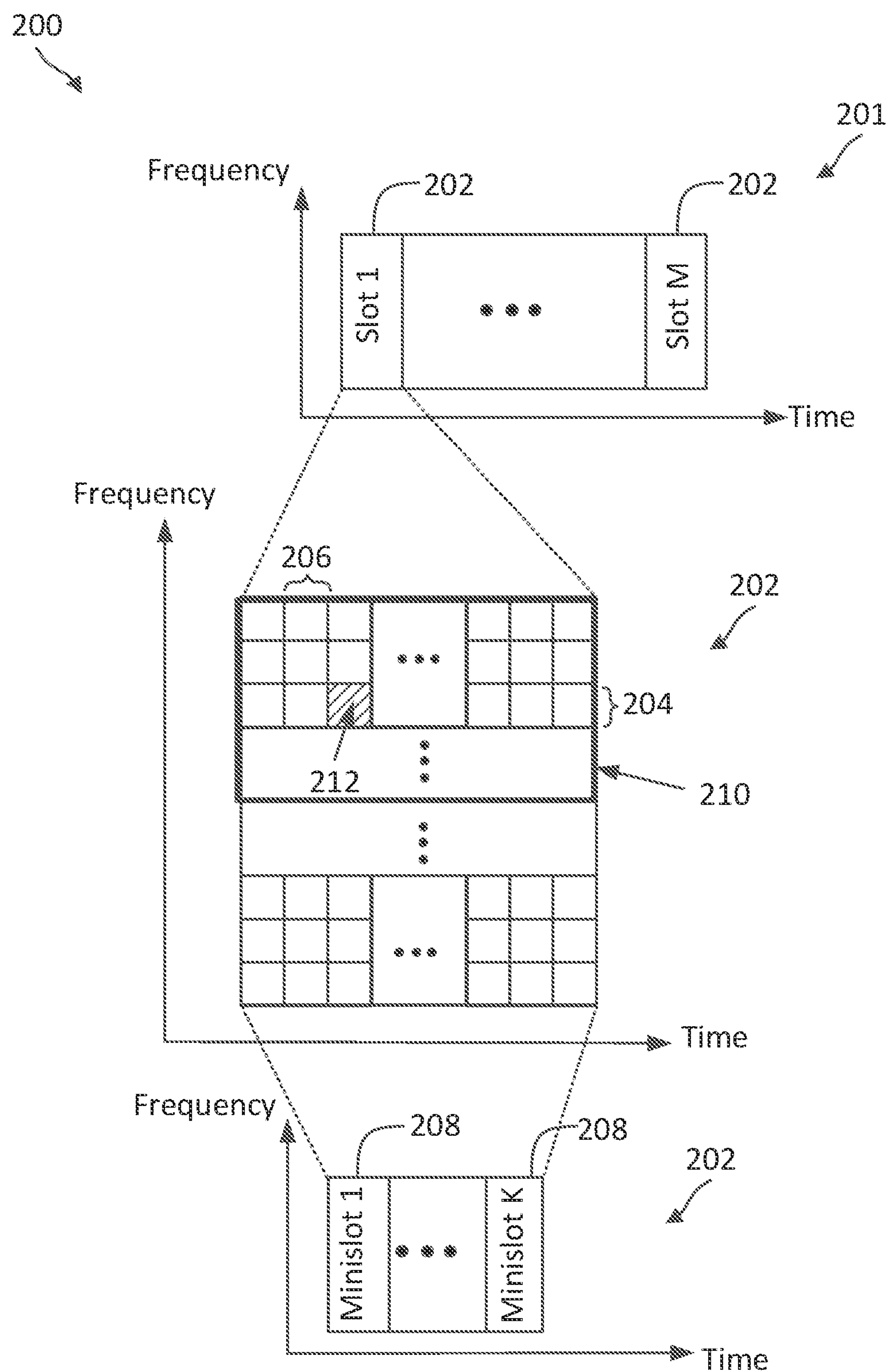
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds.

The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

In some aspects, the network 100 may be an NR-U network and the BSs 105 and the UEs 115 may operate in a synchronous channel access mode and may utilize the radio frame structure 200 for transmissions and/or receptions. In particular, a BS 105 or a UE 115 may start a transmission at a slot boundary (e.g., the start of a slot 202), and the BS 105 or the UE 115 may monitor for a reception at the slot boundary. When the network 100 operates over a shared channel, a BS 105 or a UE 115 may perform an LBT or procedure to contend for a TXOP or COT in the channel. As explained above, for a device with synchronous channel access, the device may have to wait for a gap duration before starting a transmission upon completing a successful LBT (with a contention win), for example, when the LBT completes before a next available transmission starting point (a next slot boundary). As further explained above, leaving a gap after completing an LBT and before starting a transmission (that carries information data) can cause a device with synchronous channel access to be starved of channel access opportunities, for example, when the synchronous channel access device shares a medium with asynchronous channel access devices.

Figure 11:
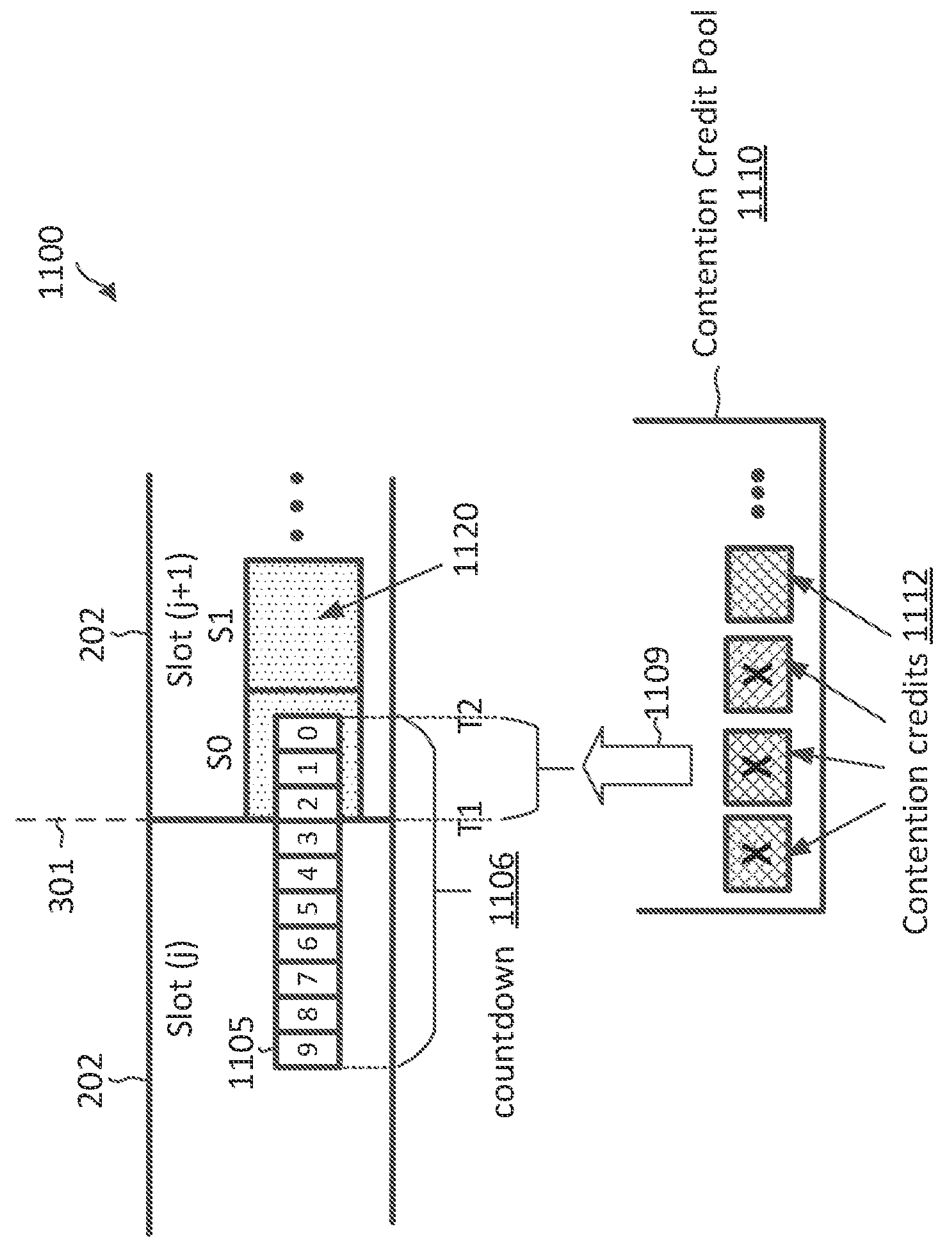
FIG. 11 illustrates a contention credit utilization scheme according to some aspects of the present disclosure.
Figure 12:
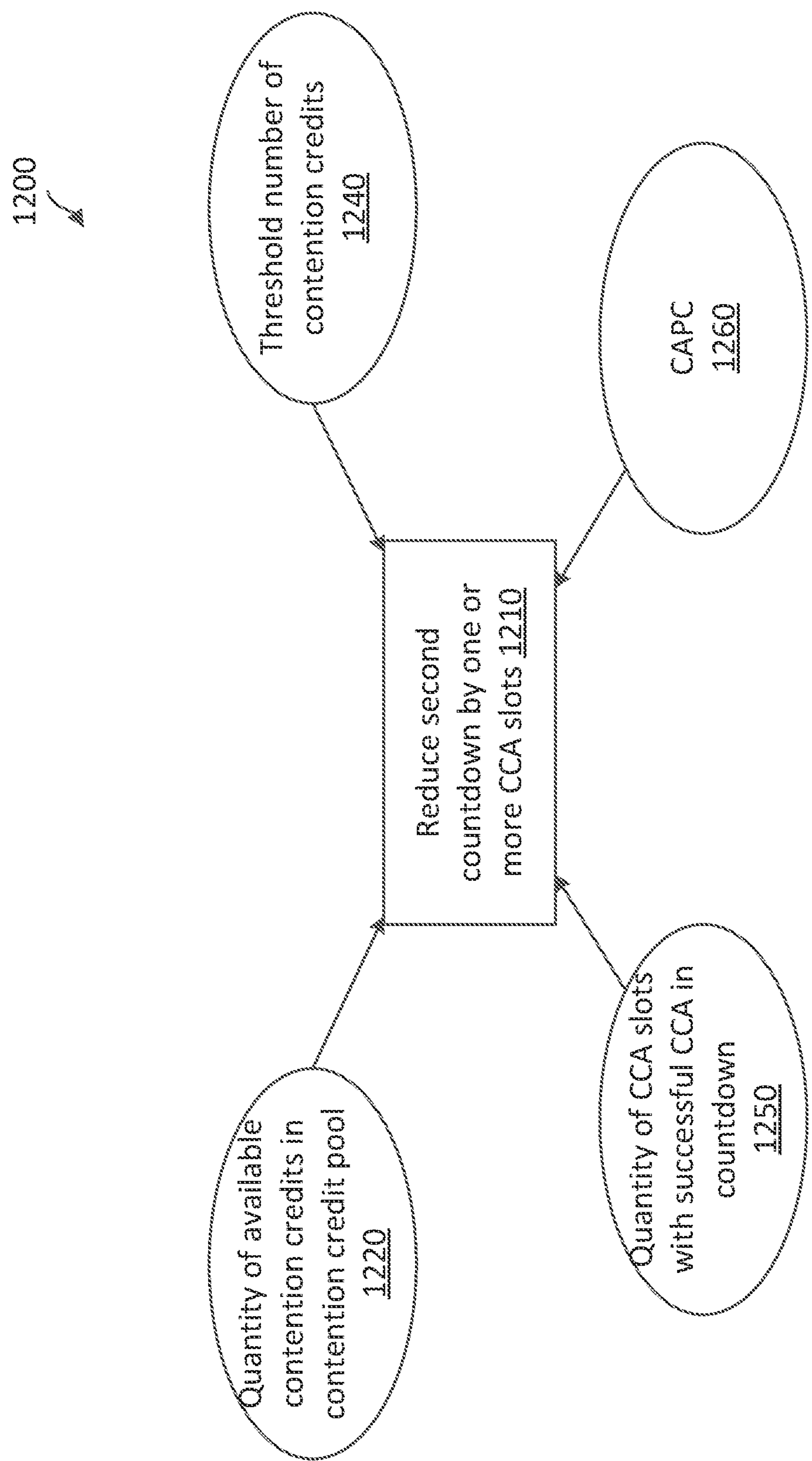
FIG. 12 illustrates a contention credit utilization scheme according to some aspects of the present disclosure.

Accordingly, the present disclosure provides techniques to mitigate channel access starvation for synchronous channel access-based devices that are coexisting with asynchronous channel access-based devices. In particular, when accessing or contending for a channel using a CAT4 LBT, a wireless communication device that is allowed to start a transmission at periodic time instants (and not any time instant) may accumulate contention credit(s) when it does not occupy the medium as permitted by the CAT4 LBT. In some instances, after the wireless communication device completes a CAT4 LBT (with a random backoff), the wireless communication device may also continue to perform CCA (during a gap between the end of the CAT4 LBT and a next available or allowable transmission start time) and gain one contention credit for each CCA performed. Additionally, the wireless communication device is allowed to utilize the contention credit(s) for a next channel access by shortening an LBT duration (a countdown or random backoff). FIGS. 3-10 illustrate various mechanisms for accumulating contention credit(s). FIGS. 11-12 illustrate various mechanisms for utilizing contention credit(s).

Figure 3:
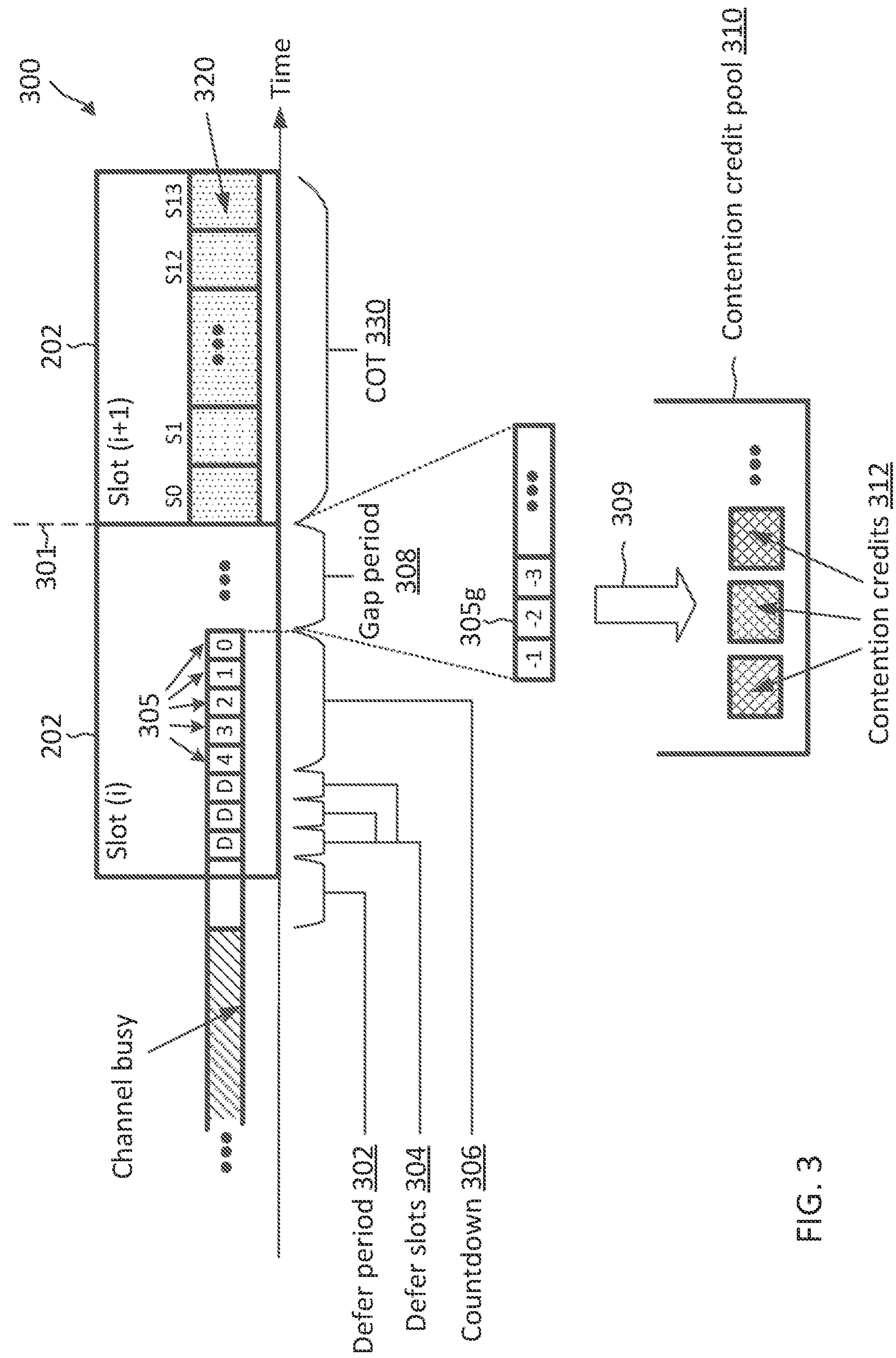
FIG. 3 illustrates a channel access scheme according to some aspects of the present disclosure.
Figure 5:
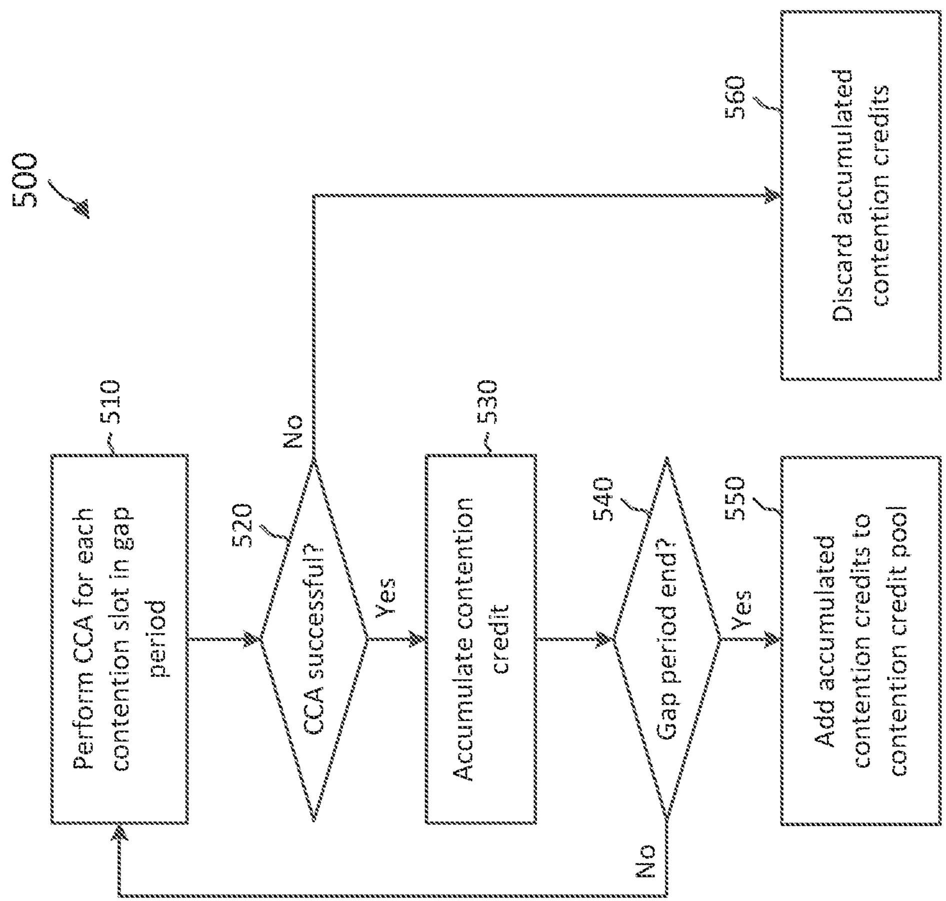
FIG. 5 is a flow diagram illustrating a contention credit accumulation method according to some aspects of the present disclosure.
Figure 4:
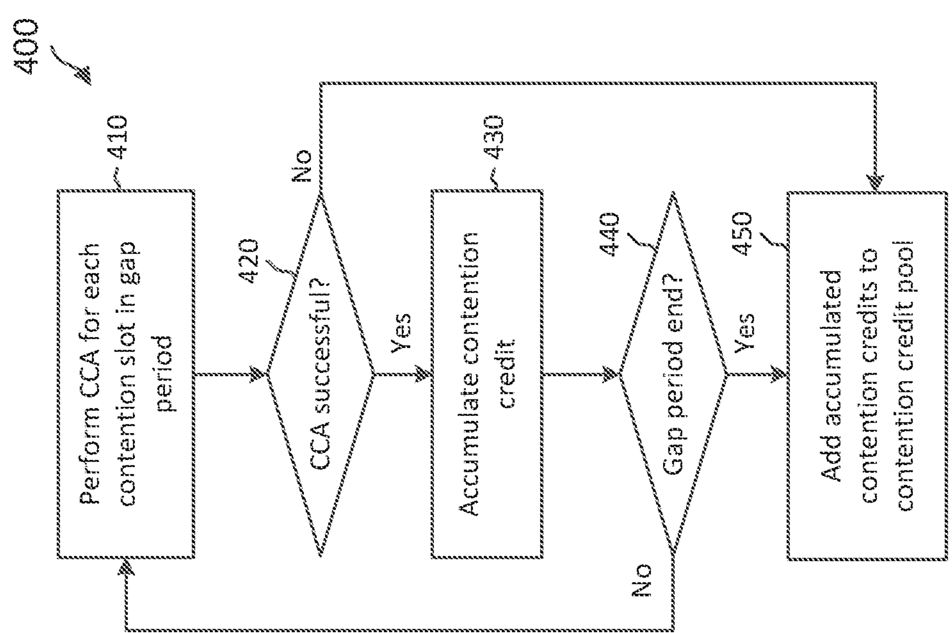
FIG. 4 is a flow diagram illustrating a contention credit accumulation method according to some aspects of the present disclosure.

FIGS. 3-5 are discussed in relation to each other to illustrate a synchronous channel access with contention credit accumulation. FIG. 3 illustrates a channel access scheme 300 with contention credit accumulation according to some aspects of the present disclosure. The scheme 300 may be employed by a wireless communication device such as the BSs 105 and/or the UEs 115 in a network such as the networks 100 for communications. In particular, the wireless communication device may operate in a synchronous channel access mode (e.g., with fixed transmission start points such as a slot boundary) and may accumulate contention credit(s) during a gap between an end of a CAT4 LBT or countdown and a start of a transmission using the scheme 300. In FIG. 3, the x-axis represents time in some arbitrary units. Additionally, the scheme 300 is illustrated using a similar slot structure as shown in FIG. 2, and may use the same reference numerals for simplicity's sake.

In the scheme 300, a wireless communication device (e.g., a BS 105 or a UE 115) may perform a CAT4 LBT in a shared channel (e.g., a FR1 band, a FR2 band, or any suitable radio frequency band) to contend for a COT for a transmission. The wireless communication device may perform sensing (e.g., an LBT or CCA) in the channel. When the channel is sensed as busy, the wireless communication device may defer for a time period (shown as a defer period 302) before performing a random backoff or countdown. As explained above, an LBT or CCA may be based on an energy detection. For instance, the wireless communication device may measure signal energy in the channel during a sensing or CCA period (e.g., the defer period 302). When the wireless communication device detected a measured signal energy above an ED threshold, the channel is busy. In some instances, the ED threshold may be regulated by regulations. In some other instances, the ED threshold may be configured to achieve a certain channel sensing range. The wireless communication device may continue with channel sensing or CCA during the defer period 302. In some aspects, the defer period 302 may have a fixed duration, for example, about 16 microseconds (μs) long.

In some aspects, after determining that the channel is idle during the defer period 302, the wireless communication device may defer further for one or more defer slots 304 (shown as boxes with the symbol "D") before performing a random backoff or countdown. The number of defer slots 304 may be dependent on a CAPC associated with the upcoming transmission. The defer slots 304 are used to prioritize channel access for transmissions with different CAPCs. In particular, a transmission with a higher priority may be assigned with a fewer number of defer slots 304 than a transmission with a lower priority. In this way, a wireless communication device with a high-priority transmission may have a greater likelihood in winning a contention in the channel than a wireless communication device with a low-priority transmission. As an example, a priority class 1 (high priority) transmission may be assigned with one defer slot 304, a priority class 2 (medium priority) transmission may be assigned with two defer slots 304, and a priority class 3 (low priority) transmission may be assigned with three defer slots 304. In some aspects, the defer slots 304 may have a fixed duration, which may be denoted as Ts. Thus, the further deferral based on CAPC may have a duration of n×Ts, where n is related to the CAPC of the upcoming transmission. The wireless communication device may perform CCA in each defer slot 304, for example, based on energy detection. In some examples, Ts may be about 9 μs long. A defer slot 304 is cleared (the channel is idle) if a channel signal energy measured by the wireless communication device is below an ED threshold.

In the illustrated example of FIG. 3, the wireless communication device may defer for three additional defer slots 304 after the defer period 302. After determining that the channel is idle during the defer slots 304, the wireless communication device may perform a random backoff or countdown 306. In this regard, the wireless communication device may draw a random number (e.g., K) based on a contention window. For instance, the drawing of the random number K may be represented by a uniform distribution function between a value of 0 and a value corresponding to the contention window size. The wireless communication device may countdown K number of contention slots 305. In some instance, a contention slot 305 may have the same duration (e.g., 9 μs) as a defer slot 304. In some instances, the defer slots 304 and the contention slots 305 may generally be referred to as CCA slots. The wireless communication device may perform channel sensing or CCA in each contention slot 305, for example, based on energy detection, during the countdown 306. A contention slot 305 is cleared (the channel is idle) if a channel signal energy measured by the wireless communication device is below an ED threshold. In some aspects, the wireless communication device may adjust the contention window size when the channel is congested. In particular, when the channel is congested, the wireless communication device may double the contention window size (e.g., up to a maximum allowable contention window size). On the other hand, when the channel is not congested, the wireless communication device may reset the contention window size to a minimum allowable contention window size. The larger the contention window size, the less aggressive the device may be in contending for the channel. As such, the expanding (e.g., the doubling) of the contention window size may help with channel congestion.

In the illustrated example of FIG. 3, the wireless communication device drew a random number 5 (e.g., K=5), and thus may countdown for five contention slots 305. The countdown is 306 is shown by the contention slots 305 marked with 4, 3, 2, 1, 0. For a CAT4 LBT, if a transmitting device or node detected that the channel continues to be idle during a countdown, the transmitting node may start a transmission at the end of the countdown 306.

However, as explained above, in a synchronous channel access system, all transmissions start at fixed starting points (e.g., a slot boundary or a mini-slot boundary). As an example, for an SCS of 30 kilohertz (kHz), an OFDM symbol may have a duration of about 71 μs. For an SCS of 15 kHz, an OFDM symbol may have a duration of about 35 μs. The CAT4 LBT may operate at a finer time grid than the contention slots 305, where each slot 305 may have a duration of 9 μs, which is about ¼ of an OFDM symbol time for an SCS of 15 kHz or ⅛ of an OFDM symbol time for an SCS of 30 kHz. This means that a countdown may successfully complete (with the channel being idle for the countdown period) at a time before a next available or allowable transmission starting point (e.g., a next slot boundary or a next mini-slot boundary). Thus, a gap may be present between the end of a countdown and the start of the transmission.

In the illustrated example of FIG. 3, the wireless communication device successfully completes the countdown 306 with the channel being idle in all the contention slots 305. As shown, the countdown 306 ends at a time within the slot (i) 202. Since the wireless communication device operates in a synchronous channel access mode, the wireless communication device waits till a next slot boundary 301 (the start of a next slot (i+1) 202) to start a transmission 320 (shown by the dotted-pattern-filled boxes) and COT 330. The transmission 320 may include data carried in a PDSCH data and/or downlink control information (DCI) carried in a PDCCH when the wireless communication device is a BS 105. Alternatively, the transmission 320 may include data carried in a PUSCH and/or uplink control information (UCI) carried in a PUCCH UCI when the wireless communication device is a UE 115. Although FIG. 3 illustrates the transmission 320 occupying all symbols (shown as S0 to S13 which may be similar to the symbols 206) in the slot (i+1) 202, it should be understood that in other examples the wireless communication device can transmit in less than all symbols in the slot (i+1) 202 or in more than one slot 202. Similarly, the COT 330 can be shorter or longer in duration. Further, the slot (i) 202 may include symbols similar to the symbols S0 to S13, but are not shown for simplicity.

As can be seen, since the wireless communication device may not start the transmission 320 until the next slot boundary 301, there is a gap period 308 between the end of the countdown 306 and the start of the transmission 320. The gap period 308 is a silence period with no transmission from the wireless communication device.

In the scheme 300, the wireless communication device may continue to countdown during the gap period 308, for example, according to European Telecommunications Standards Institute (ETSI). In that regard, the contention slots 305 may continue into the gap period 308. The contention slots 305 within the gap period 308 are shown as 305*g*. The number of contention slots 305 that may fit into the gap period 308 may depend on the duration of the gap period 308 and the duration of the contention slots 305. The wireless communication device may continue the countdown as a negative countdown, for example, with −1, −2, −3, and so forth as shown, for each contention slot 305*g* within the gap period 308. The wireless communication device may continue to perform a CCA for each contention slot 305*g* within the gap period 308. At the end of the gap period 308, if the channel continues to be idle (that is, the wireless communication device determines that all contention slots 305*g* within the gap period 308 are cleared with measured signal energy below the ED threshold), the wireless communication device may proceed to transmit the transmission 320 in the slot (i+1) 202 beginning at the slot boundary 301.

Leaving the gap period 308 between the end of a countdown 306 and the start of the transmission 320 can result in unfair medium utilization. As explained above, another wireless communication device may also be contending for the channel at the same time as the wireless communication device and may potentially "jump-in" and access the channel during the gap period 308. In an example, the other wireless communication device may be a WiFi device (a IEEE 802.11 access point or station) utilizing asynchronous channel access with transmission starting at any time. Thus, upon successfully completing a countdown, for example, at a point of time within the gap period 308, the other wireless communication device may proceed with transmitting in the channel (occupying the channel). In another example, the other wireless communication device may be a high-capability device utilizing synchronous channel access, but may perform mini-slot-based transmissions. Thus, upon successfully completing a countdown, for example, at a point of time within the gap period 308, the other wireless communication device may proceed with transmitting in the channel at a mini-slot boundary, which may be at a time before the slot boundary 301 (again occupying the channel). In a further example, the other wireless communication device may also utilize synchronous channel access, but may have slot boundaries that are time offset from slot boundaries (e.g., the slot boundary 301) used by the wireless communication device. For example, the other wireless communication device may communicate based on a second slot boundary that is earlier than the slot boundary 301, for example, by 1 symbol or 2 symbols. Thus, upon successfully completing a countdown, for example, at a point of time within the gap period 308, the other wireless communication device may proceed with transmitting in the channel at the second slot boundary before the slot boundary 301 (again occupying the channel before the wireless communication device). Thus, the wireless communication device may detect channel signal energy in one or more of the contention slots 305*g* in the gap period 308 to be above the ED threshold. In other words, the wireless communication device may detect a CCA failure in the gap period 308 and may restart a countdown. The restarting of the countdown is effectively a penalty for the wireless communication device since the wireless communication device won the contention with the countdown 306, but lost the transmission opportunity in the channel to the other wireless communication device from the extra countdown during the gap period 308. Accordingly, continuing countdown and CCA during the gap period 308 can cause medium utilization unfairness for the wireless communication device (with the synchronous channel access).

As further illustrated in FIG. 3, the wireless communication device can accumulate contention credits during the gap period 308. At 309, the wireless communication device adds one or more contention credits 312 to a contention credit pool 310 based on the gap period 308. In particular, during the gap period 308, the wireless communication device may continue to perform CCA in each contention slot 305*g* (with the negative countdown −1, −2, −3, . . . ) in the gap period 308 and may add one contention credit 312 for each contention slot 305*g* with a successful CCA. The contention credit pool 310 is a collection of accumulated contention credits 312. In some aspects, the wireless communication device may store or track the number of contention credits 312 in the contention credit pool 310 by using a counter. The wireless communication device may increment the counter by one when adding a contention credit 312 to the contention credit pool 310. The wireless communication device may utilize the contention credits 312 for reducing a countdown at a later time, for example, by starting a transmission (at a slot boundary) before the completion of a countdown, as will be discussed more fully below with respect to FIGS. 11 and 12. FIGS. 4 and 5 provide two different options for accumulating and/or adding contention credits to a contention credit pool. For instance, in FIG. 4, a wireless communication device may retain and add contention credit(s) accumulated during a gap period (after a countdown and before a next slot boundary) to a contention credit pool irrespective of whether the wireless communication device can access the channel at the end of the gap period or not, whereas in FIG. 5, a wireless communication device may retain and add contention credit(s) accumulated during a gap period (after a countdown and before a next slot boundary) to a contention credit pool if the wireless communication device is successful in gaining access to the channel at the end of the gap period.

FIG. 4 is a flow diagram of a contention credit accumulation method 400 according to some aspects of the present disclosure. Aspects of the method 400 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 400. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 400. The method 400 may be employ in conjunction with the scheme 300 described above in FIG. 3. As illustrated, the method 400 includes a number of enumerated blocks, but aspects of the method 400 may include additional blocks before, after, and in between the enumerated blocks. In some aspects, one or more of the enumerated blocks may be omitted or performed in a different order.

The method 400 is discussed with reference to FIG. 3. In particular, the wireless communication device may implement the method 400 during the gap period 308 after successfully completing the countdown 306 and before a next allowable transmission starting point (the next slot boundary 301). At block 410, the wireless communication device performs a CCA for each contention slot 305*g* in the gap period 308. For instance, the wireless communication device may receive a signal from the channel during each contention slot 305*g* and may determine or measure signal energy (e.g., a received signal power) for the received signal and compare the channel signal energy to an ED threshold.

At block 420, the wireless communication device determines whether the CCA is successful. If the determined or measured channel signal energy is below the ED threshold, the CCA is successful and the wireless communication device proceeds to block 430.

At block 430, the wireless communication device accumulates one contention credit 312 based on the successful CCA in the contention slot 305*g*. For instance, the wireless communication device may utilize a first counter to track the number of accumulated contention credits 312, for example, by incrementing the first counter for each accumulated contention credit 312.

At block 440, the wireless communication device determines whether the gap period 308 has ended. If not, the wireless communication device may return to block 410 and may repeat the CCA for a next contention slot 305*g*. Otherwise, the wireless communication device proceeds to block 450.

At block 450, the wireless communication device adds the accumulated contention credit(s) 312 to the contention credit pool 310. For instance, the wireless communication device may utilize a second counter to track the number of contention credits 312 in the contention credit pool 310. Thus, the wireless communication device may add the first counter to the second counter.

Returning to block 420, if the channel signal energy exceeds the ED threshold, the CCA fails and the wireless communication device proceeds to block 450 and adds the accumulated contention credits before the CCA failure to the contention credit pool 310. Subsequently, the wireless communication device may restart a random backoff or countdown 306.

FIG. 5 is a flow diagram of a contention credit accumulation method 500 according to some aspects of the present disclosure. Aspects of the method 500 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 500. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 500. The method 500 may be employed in conjunction with the scheme 300 described above in FIG. 3. As illustrated, the method 500 includes a number of enumerated blocks, but aspects of the method 500 may include additional blocks before, after, and in between the enumerated blocks. In some aspects, one or more of the enumerated blocks may be omitted or performed in a different order.

Generally speaking, the method 500 includes features similar to method 400 in many respects. For example, blocks 510, 530, 540, 550 are similar to blocks 410, 430, 440, and 450, respectively. Accordingly, for sake of brevity, details of those blocks will not be repeated here.

The method 500 is discussed with reference to FIG. 3. In particular, the wireless communication device may implement the method 500 during the gap period 308 after successfully completing the countdown 306 and before a next allowable transmission starting point (the next slot boundary 301).

If, at block 520, the wireless communication device determines that the CCA for a contention slot 305*g* in the gap period 308 is unsuccessful (e.g., the measured channel signal energy exceeds the ED threshold), the wireless communication device proceeds to block 560.

At block 560, the wireless communication device discards the contention credits 312 accumulated in the gap period before the CCA failure. In other words, the wireless communication device may refrain from adding any contention credit accumulated in the gap period 308 to the contention credit pool 310. For instance, the wireless communication device may utilize a first counter to track the number of contention credits 312 accumulated during the gap period 308 and may utilize a second counter to track the number of contention credits 312 in the contention credit pool as discussed above with reference to block 430 and 450, respectively. Thus, upon detecting a CCA failure in the gap period 308, the wireless communication device may not add the first counter to the second counter and may reset the first counter to 0.

FIGS. 6-10 are discussed in relation to each other to illustrate another synchronous channel access with contention credit accumulation.

Figure 6:
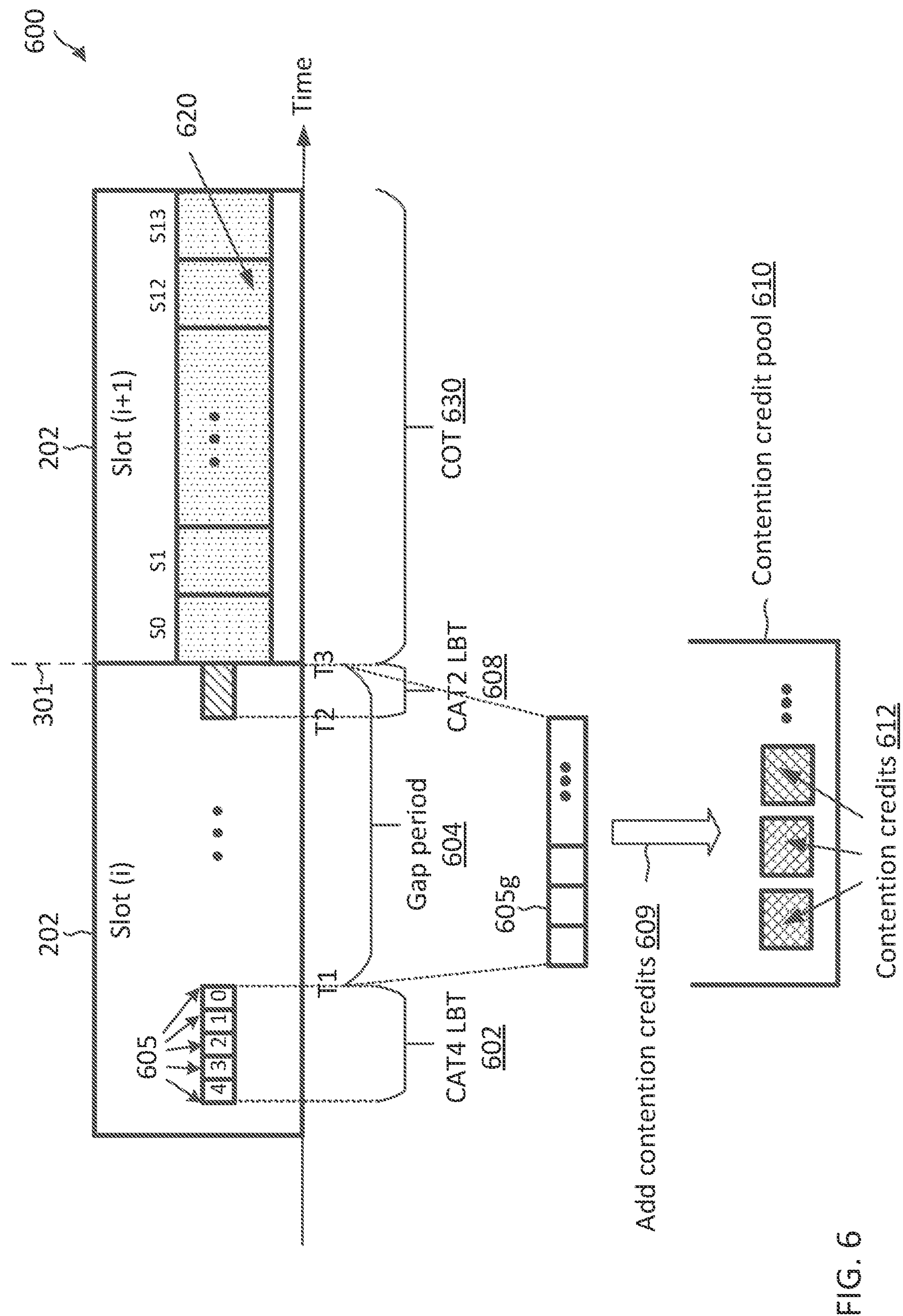
FIG. 6 illustrates a channel access scheme according to some aspects of the present disclosure.

FIG. 6 illustrates a channel access scheme 600 according to some aspects of the present disclosure. The scheme 600 may be employed by a wireless communication device such as the BSs 105 and/or the UEs 115 in a network such as the networks 100 for communications. In particular, the wireless communication device may operate in a synchronous channel access mode (e.g., with fixed transmission start points such as a slot boundary) and may accumulate contention credit(s) during a gap between an end of a CAT4 LBT or countdown and a start of a transmission using the scheme 600. In FIG. 6, the x-axis represents time in some arbitrary units. The scheme 600 is substantially similar to the scheme 300, but may perform a CAT2 LBT at the end of a gap period before the start of a transmission instead of performing a negative countdown as in the scheme 300.

As shown in FIG. 6, a wireless communication device (e.g., a BS 105 or a UE 115) may perform a CAT4 LBT 602 contend for a COT in the channel. The CAT4 LBT 602 may include a random backoff or countdown (e.g., similar to the countdown 306). The CAT4 LBT 602 includes a number of contention slots 605 (e.g., each with a duration of about 9 μs, for example, when operating in FR1). The contention slots 605 may also be referred to as CCA slots. In the illustrated example of FIG. 6, the wireless communication device drew a random number 5 (e.g., K=5), and thus may countdown for five contention slots 605 (marked with 4, 3, 2, 1, 0) for the CAT4 LBT 602. The wireless communication device may perform a CCA for each contention slot 605, for example, based on energy detection as explained above. The CAT4 LBT 602 may be a pass. That is, the wireless communication device may determine that signal energy measured for each contention slot 605 is below an ED threshold. For a CAT4 LBT, if a transmitting device or node detected that the channel continues to be idle during a countdown, the transmitting node may start a transmission at the end of the CAT4 LBT 602. However, the wireless communication device is not allowed to start a transmission at any time instant due to the synchronous channel access. Thus, after passing the CAT4 LBT 602 within the slot(i) 202, the wireless communication device may wait till the next slot boundary 301 to start a transmission, resulting in a gap period 604 between the end of the CAT4 LBT 602 and the start of the transmission 620. The gap period 604 is a silence period with no transmission from the wireless communication device.

In the scheme 600, the wireless communication device may pause the CCA (put the CCA on hold) during the gap period 604 and perform a CAT2 LBT 608 towards the end of the gap period (at time T2 before the next slot boundary 301 at time T3) to verify that the channel is available, for example, according to 3GPP. In some instances, the CAT2 LBT 608 may be a one-shot LBT with a CCA duration of 25 μs (from time T2 to T3). The CAT2 LBT 608 may be a pass. That is, the wireless communication device may determine that signal energy measured for duration from time T2 and T3 is below an ED threshold. Upon passing the CAT2 LBT 608, the wireless communication device may start a transmission 620 (shown by the dotted-pattern-filled boxes) and COT 630. The transmission 620 may include data carried in a PDSCH data and/or downlink control information (DCI) carried in a PDCCH when the wireless communication device is a BS 105. Alternatively, the transmission 320 may include data carried in a PUSCH and/or uplink control information (UCI) carried in a PUCCH UCI when the wireless communication device is a UE 115. Although FIG. 6 illustrates the transmission 620 occupying all symbols (shown as S0 to S13 which may be similar to the symbols 206) in the slot (i+1) 202, it should be understood that in other examples the wireless communication device can transmit in less than all symbols in the slot (i+1) 202 or in more than one slot 202. Similarly, the COT 630 can be shorter or longer in duration. Further, the slot (i) 202 may include symbols similar to the symbols S0 to S13, but are not shown for simplicity.

Leaving the gap period 604 between the end of a countdown or CAT4 LBT 602 and the start of the transmission 620 can result in unfair medium utilization. As explained above, another wireless communication device may also be contending for the channel at the same time as the wireless communication device. Upon successfully completing a countdown, for example, at a point of time within the gap period 604, the other wireless communication device may "jump-in" and proceed with transmitting in the channel (occupying the channel). Thus, the wireless communication device may detect a channel signal energy measurement above the ED threshold for the CAT2 LBT 608. In other words, the CAT2 LBT 608 fails and the wireless communication device may refrain from transmitting in the channel. In other words, the wireless communication device won the contention with the CAT4 LBT 602, but lost the transmission opportunity to the other wireless communication device due to the gap period 604.

As further illustrated in FIG. 6, the wireless communication device can accumulate contention credits during the gap period 604. At 609, the wireless communication device adds one or more contention credits 612 to a contention credit pool 610 based on the gap period 604. The wireless communication device may determine a number of contention credits 612 for the gap period 604 in a variety of ways. In one aspect, the wireless communication device may determine a quantity of contention credits for the gap period 604 (e.g., based on a number of contention slots 605*g*) without actually performing CCA during the gap period 604 before the CAT2 LBT 608 as discussed below with reference to FIGS. 7-8. In another aspect, the wireless communication device may perform CCA (e.g., in each contention slots 605) during the gap period 604 before the CAT2 LBT 608 as discussed below with reference to FIGS. 9-10. Further, in FIGS. 7 and 9, a wireless communication device may retain and add contention credit(s) accumulated during a gap period (after a countdown and before a next slot boundary) to a contention credit pool irrespective of whether the wireless communication device can access the channel at the end of the gap period or not, whereas in FIGS. 8 and 10, a wireless communication device may retain and add contention credit(s) accumulated during a gap period (after a countdown and before a next slot boundary) to a contention credit pool if the wireless communication device is successful in gaining access to the channel at the end of the gap period.

Figures 7, 8:
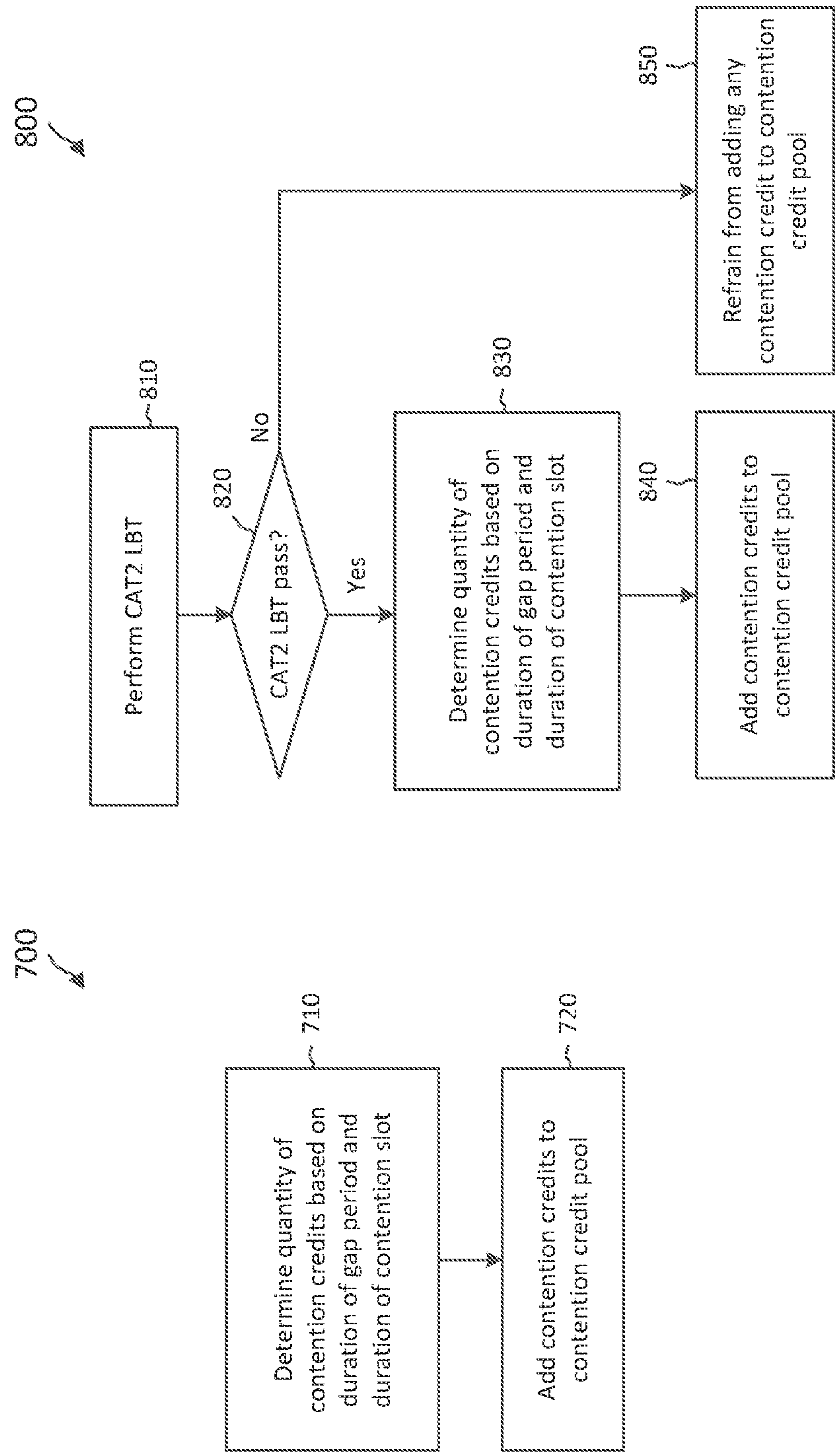
FIG. 7 is a flow diagram illustrating a contention credit accumulation method according to some aspects of the present disclosure.
FIG. 8 is a flow diagram illustrating a contention credit accumulation method according to some aspects of the present disclosure.

FIG. 7 is a flow diagram of a contention credit accumulation method 700 according to some aspects of the present disclosure. Aspects of the method 700 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 700. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 700. The method 700 may be employed in conjunction with the scheme 600 described above in FIG. 6. As illustrated, the method 700 includes a number of enumerated blocks, but aspects of the method 700 may include additional blocks before, after, and in between the enumerated blocks. In some aspects, one or more of the enumerated blocks may be omitted or performed in a different order.

The method 700 is discussed with reference to FIG. 6. In particular, the wireless communication device may implement the method 700 after passing the CAT4 LBT 602. At block 710, the wireless communication device determines a quantity of contention credits 612 based on a duration of the gap period 604 and a duration of a contention slot 605, for example, as shown below:

$$C1 = \text{floor}\left(\frac{T_3 - T_1}{T_S}\right), \tag{1}$$

where C1 represents a quantity of contention credits 612 to be added to the contention credit pool 610, $T_1$ is the start time of the gap period 604, $T_3$ is the end time of the gap period 604, and thus $T_3$-$T_1$ is the gap period 604. $T_s$ represent a duration of a contention slot 605. In other words, the wireless communication device determines a number of contention slot 605*g* that the gap period 604 may include and add one contention credit 612 for each contention slot 605*g* within the gap period 604. However, the wireless communication device may not perform any CCA in those contention slots 605*g*.

At block 720, the wireless communication device adds the accumulated contention credit(s) 612 to the contention credit pool 610. For instance, the wireless communication device may utilize a counter to track the number of contention credits 612 in the contention credit pool 610. Thus, the wireless communication device may add C to the counter.

As can be seen from the method 700, the wireless communication device may add the contention credits 612 determined based on the gap period 604 without depending on the result of the CAT2 LBT 608 at the end of the gap period 604.

FIG. 8 is a flow diagram of a contention credit accumulation method 800 according to some aspects of the present disclosure. Aspects of the method 800 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 800. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 800. The method 800 may be employed in conjunction with the scheme 600 described above in FIG. 6. As illustrated, the method 800 includes a number of enumerated blocks, but aspects of the method 800 may include additional blocks before, after, and in between the enumerated blocks. In some aspects, one or more of the enumerated blocks may be omitted or performed in a different order.

Generally speaking, the method 800 includes features similar to method 700 in many respects. For example, blocks 830 and 840 are similar to blocks 710 and 720, respectively. Accordingly, for sake of brevity, details of those blocks will not be repeated here.

The method 700 is discussed with reference to FIG. 6. In particular, the wireless communication device may implement the method 800 after passing the CAT4 LBT 602. At block 810, the wireless communication device performs the CAT2 LBT 608. For instance, the wireless communication device may receive a signal from the channel over the duration between time T2 and time T3 of FIG. 6, may determine signal energy (e.g., a received signal power) for the received signal and compare the channel signal energy to an ED threshold.

At block 820, the wireless communication device determines whether the CAT2 LBT 608 passes. If the determined or measured channel signal energy is below the ED threshold, the CAT2 LBT 608 is successful and the wireless communication device proceeds to block 830, where the wireless communication device determines a quantity of contention credits 612 based on a duration of the gap period 604 and a duration of a contention slot 605, and adds the contention credits 612 to the contention credit pool as discussed above with reference to blocks 710 and 720, respectively. If, however, the determined or measured channel signal energy is below the ED threshold, the CAT2 LBT 608 fails and the wireless communication device may refrain from adding any contention credit 612 to the contention credit pool 610 at block 850.

Figures 9, 10:
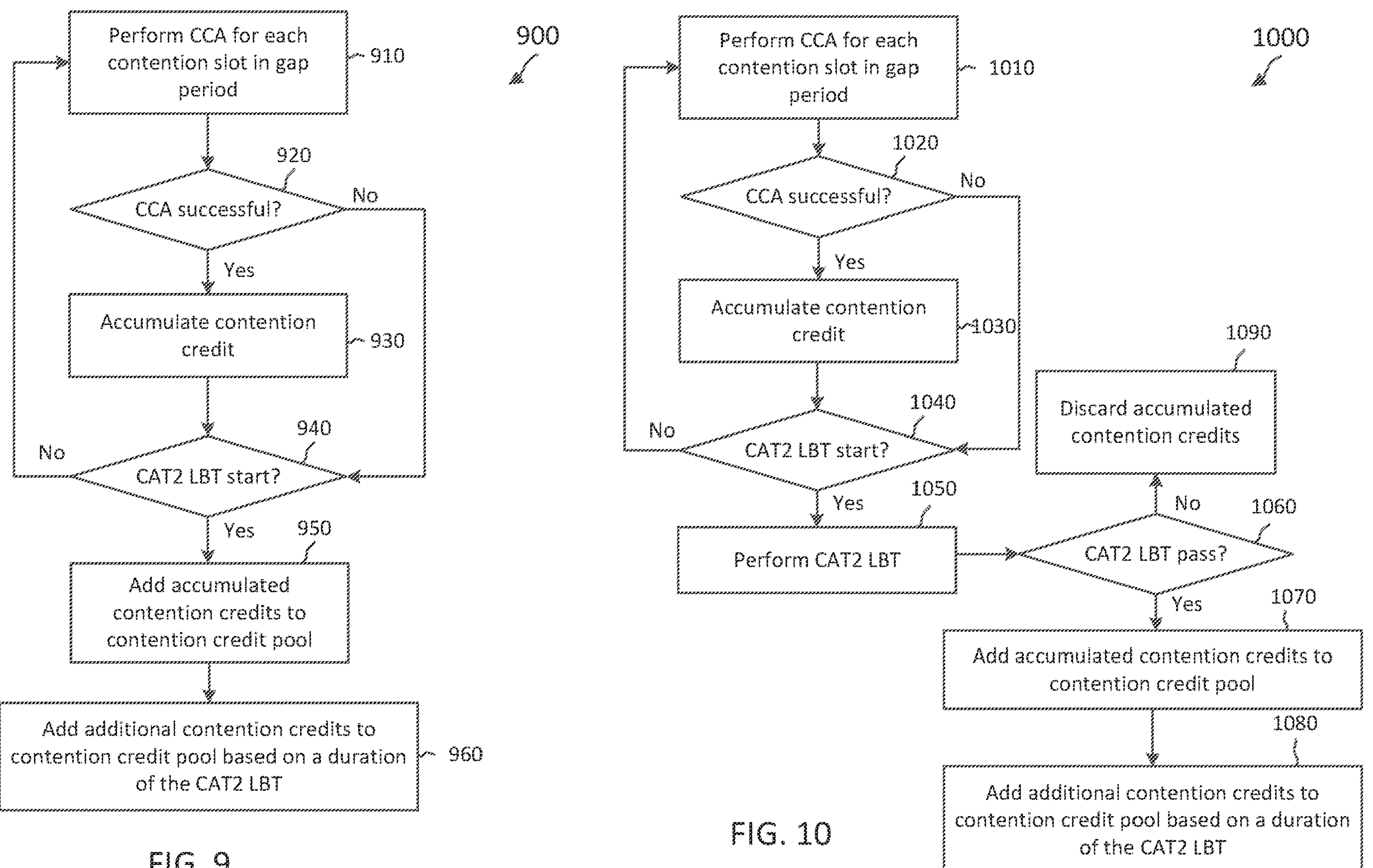
FIG. 9 is a flow diagram illustrating a contention credit accumulation method according to some aspects of the present disclosure.
FIG. 10 is a flow diagram illustrating a contention credit accumulation method according to some aspects of the present disclosure.

FIG. 9 is a flow diagram of a contention credit accumulation method 900 according to some aspects of the present disclosure. Aspects of the method 900 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 900. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 900. The method 900 may be employed in conjunction with the scheme 600 described above in FIG. 6. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

Generally speaking, the method 900 includes features similar to method 400 in many respects. For example, blocks 910. 920, 930, and 950 are similar to blocks 410, 420, 430, and 450, respectively. Accordingly, for sake of brevity, details of those blocks will not be repeated here.

The method 900 is discussed with reference to FIG. 6. In particular, the wireless communication device may implement the method 900 after passing the CAT4 LBT 602. At block 910, the wireless communication device performs a CCA for each contention slot 605*g* in the gap period 604, for example, using similar mechanisms as discussed above with reference to block 410.

At block 920, the wireless communication device determines whether the CCA is successful. If the determined or measured channel signal energy is below the ED threshold, the CCA is successful and the wireless communication device proceeds to block 930.

At block 930, the wireless communication device accumulates one contention credit 612 based on the successful CCA in the contention slot 605*g*, for example, as discussed above with reference to block 430.

At block 940, the wireless communication device determines whether the CAT2 LBT 608 is to be started, for example, whether it has reached CAT2 LBT 608 starting time (T2 shown in FIG. 6). If not, the wireless communication device may return to block 910 and may repeat the CCA for a next contention slot 605*g* in the gap period 604. Otherwise, the wireless communication device proceeds to block 950.

At block 950, the wireless communication device adds the contention credit(s) 612 accumulated at block 930 to the contention credit pool 610, for example, as discussed above with reference to block 450.

At block 960, the wireless communication device adds additional contention credit(s) 612 to the contention credit pool 610 based on a duration of the CAT2 LBT 608. For instance, if the CAT2 LBT 608 is performed over a duration of 25 μs and the contention slot 605*g* has a duration of 9 μs, the wireless communication device may add 2 additional contention credits 612 to the contention credit pool 610. Thus, the total number of contention credits 612 to be added to the contention credit pool 610 based on the gap period 604 may be expressed as shown below:

$$C2 = \text{floor}\left(\frac{T_2 - T_1}{T_S}\right) + 2, \tag{2}$$

where C2 represents a quantity of contention credits 612, $T_1$ is the start time of the gap period 604, $T_2$ is the start time of the CAT2 LBT 608, and thus $T_2$-$T_1$ is the gap period 604 minus the CAT2 LBT 608 duration. Ts represent a duration of a contention slot 605.

Returning to block 920, if the wireless communication device determines that the CCA is unsuccessful (e.g., the measured channel signal energy exceeds the ED threshold), the wireless communication device proceeds to block 940 to determine whether it has reached the CAT2 LBT 608 starting time. If not, the wireless communication device continues to perform CCA during the gap period 604 as discussed at action 910.

As can be seen from the method 900, the wireless communication device may add the contention credits 612 determined based on the gap period 604 without depending on the result of the CAT2 LBT 608 at the end of the gap period 604.

FIG. 10 is a flow diagram of a contention credit accumulation method 1000 according to some aspects of the present disclosure. Aspects of the method 1000 can be executed by a computing device (e.g., a processor, processing circuit, and/or other suitable component) of a wireless communication device or other suitable means for performing the blocks. For example, a UE 115, 1400 may utilize one or more components, such as the processor 1402, the memory 1404, the contention credit module 1408, the transceiver 1410, the modem 1412, and the one or more antennas 1416 with reference to FIG. 14, to execute the blocks of method 1000. In another example, a BS 105, 1300, may utilize one or more components, such as the processor 1302, the memory 1304, the contention credit module 1308, the transceiver 1310, the modem 1312, and the one or more antennas 1316 with reference to FIG. 13, to execute the blocks of method 1000. The method 900 may be employed in conjunction with the scheme 600 described above in FIG. 6. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

Generally speaking, the method 1000 includes features similar to methods 900 in many respects. For example, blocks 1010, 1020, 1030, 1040, 1070, and 1080 are similar to blocks 910, 920, 930 940, 950, and 960, respectively. Accordingly, for sake of brevity, details of those blocks will not be repeated here.

The method 1000 is discussed with reference to FIG. 6. In particular, the wireless communication device may implement the method 1000 after passing the CAT4 LBT 602. If, at block 1040, the wireless communication device determines that it has reached the CAT2 LBT 608 starting time, the wireless communication device proceeds to block 1050. At block 1050, the wireless communication device performs the CAT2 LBT 608. For instance, the wireless communication device may receive a signal from the channel over the duration between time T2 and time T3 of FIG. 6, may determine signal energy (e.g., a received signal power) for the received signal and compare the channel signal energy to an ED threshold.

At block 1060, the wireless communication device determines whether the CAT2 LBT 608 passes. If the determined or measured channel signal energy is below the ED threshold, the CAT2 LBT 608 is successful and the wireless communication device proceeds to block 1070.

At block 1070, the wireless communication device adds the accumulated contention credit(s) 612 (from block 1030) to the contention credit pool 610, for example, as discussed above with reference to block 950.

At block 1080, the wireless communication device adds additional contention credit(s) 612 to the contention credit pool 610 based on a duration of the CAT2 LBT 608, for example, as discussed above with reference to block 960.

Returning to block 1060, if the CAT2 LBT 608 fails, the wireless communication device proceeds to block 1090. At block 1090, the wireless communication device discards the accumulated contention credit(s) (accumulated over the gap period 604). In other words, the wireless communication device may refrain adding any contention credit 612 to the contention credit pool 610 based on the gap period 604 upon a CAT2 LBT failure at the end of the gap period 604.

Returning to block 1020, if the wireless communication device determines that the CCA is unsuccessful (e.g., the measured channel signal energy exceeds the ED threshold), the wireless communication device proceeds to block 1040 to determine whether it has reached the CAT2 LBT 608 starting time. If not, the wireless communication device continues to perform CCA during the gap period 604 as discussed at block 1010.

FIG. 11 illustrates a contention credit utilization scheme 1100 according to some aspects of the present disclosure. The scheme 1100 may be employed by a wireless communication device such as the BSs 105 and/or the UEs 115, in a network such as the networks 100 for communications. In particular, the wireless communication device may operate in a synchronous channel access mode (e.g., based on slot boundary 301) and may utilize contention credit(s) to shorten a CAT4 LBT or countdown using the scheme 1100. In FIG. 11, the x-axis represents time in some arbitrary units. The scheme 1100 may be implemented in conjunction with the scheme 300 and/or 400 described above with reference to FIGS. 3 and/or 4, respectively, and/or the methods 400, 500, 700, 800, 900, and/or 1000 discussed above with reference to FIGS. 4, 5, 7, 8, 9, and/or 10, respectively.

In the scheme 1100, a wireless communication device (e.g., a BS 105 or a UE 115) may have accumulated a plurality of contention credits 1112 stored in a contention credit pool 1110. In some aspects, the wireless communication device may accumulate the contention credits 1112 using the scheme 300 discussed above with reference to FIG. 3 and/or the methods 400 and/or 500 as discussed above with reference to FIGS. 4 and/or 5, respectively. For instance, the contention credits 1112 may correspond to the contention credits 312. In other aspects, the wireless communication device may accumulate the contention credits 1112 using the scheme 600 discussed above with reference to FIG. 6 and/or the methods 700, 800, 900, and/or 1000 as discussed above with reference to FIGS. 7, 8, 9, and/or 10, respectively. For instance, the contention credits 1112 may correspond to the contention credits 612.

After accumulating the contention credits 1112, the wireless communication device may utilize one or more of the contention credits 1112 in CCA or CAT4 LBT at a later time. In the illustrated example of FIG. 11, the wireless communication device may perform a CCA or CAT4 LBT with a random backoff or countdown 1106 by drawing a random number. For instance, the wireless communication device drew a random number 10 based on a contention window size, for example, using similar mechanisms as discussed above with reference to FIG. 3.

In a normal countdown, the wireless communication device may perform the countdown 1106 by performing a CCA in each of 10 contention slots 1105 (e.g., the contention slots 305 and/or 605) and may start a transmission at the end of the countdown 1106 (when all CCAs are successful). The countdown 1106 is shown by the contention slots 1105 marked with 9, 8, 7, 6, 5, 4, 3, 2, 1, 0. However, since the wireless communication device had accumulated contention credits 1112 from previous channel access, the wireless communication device may have a discount for the random backoff or countdown 1106. The discount may refer to a reduced or shortened countdown. For instance, the wireless communication device may reduce the countdown 1106 by one or more contention slots 1105 using one or more contention credits 1112.

In the illustrated example of FIG. 11, the wireless communication device may utilize three contention credits 1112 (marked with the symbols "X") from the contention credit pool 1110 to reduce the countdown 1106 by three contention slots 1105 as shown by 1109. As shown, instead of waiting till the end of the countdown 1106 at time T2 to start a transmission, the wireless communication device starts a transmission 1120 (shown by the dotted-pattern-filled boxes) or COT at a time that is 3 contention slots 1105 before the end of the countdown 1106, which also coincides with the slot boundary 301 (start of the slot (j+1) 202). In some instances, the transmission 1120 may include at least one of a PDSCH, a PDCCH, a PUSCH, or a PUCCH transmission and may occupy any suitable number of symbols in the slot (j+1) 202.

The utilization of the three contention credits 1112 (marked with the symbols "X") may include the wireless communication device removing the contention credits 1112 from the contention credit pool 1110. As similarly described above, the wireless communication device may utilize a counter to track the number of available or accumulated contention credits 1112 in the contention credit pool 1110. Thus, the wireless communication device may subtract 3 from the counter. Although FIG. 11 illustrates the wireless communication device utilizing three contention credits 1112 for the countdown 1106, it should be understood that in other examples the wireless communication device may utilize a few number of contention credits (e.g., 1 or 2) or a greater number of contention credits 1112 (e.g., 4, 5 or more). In general, the wireless communication device may determine a quantity of contention credits to be used for reducing the countdown 1106 in a variety of ways as discussed below in FIG. 12.

FIG. 12 illustrates a contention credit utilization scheme 1200 according to some aspects of the present disclosure. The scheme 1200 may be employed by a wireless communication device such as the BSs 105 and/or the UEs 115 in a network such as the networks 100 for communications. In particular, the wireless communication device may operate in a synchronous channel access mode (e.g., based on slot boundary 301) and determine a number of contention credit (s) to be used for shortening a CAT4 LBT or countdown using the scheme 1200. The scheme 1200 may be implemented after the wireless communication device had accumulated contention credits (e.g., 312, 612, and/or 1112) using 300 and/or 600 described above with reference to FIGS. 3 and/or 6, respectively, and/or the methods 400, 500, 700, 800, 900, and/or 1000 discussed above with reference to FIGS. 4, 5, 7, 8, 9, and/or 10, respectively. The scheme 1200 may be implemented at 1109 of FIG. 11.

The scheme 1200 is discussed with reference to FIG. 11. At 1210, the wireless communication device reduces the countdown 1106 by one or more contention slots 1105. The wireless communication device may determine a quantity of the one or more contention slots 1105 for reducing the countdown 1106 based several factors. In some aspects, the wireless communication device may determine the quantity of the one or more contention slots 1105 for reducing the countdown 1106 based on a quantity of available contention credits 1112 in the contention credit pool 1110 as shown by 1220. For instance, if the contention credit pool 1110 has 5 contention credits 1112 available, the wireless communication device may utilize all 5 contention credits 1112 to reduce the countdown 1106 by 5 contention slots 1105.

In some aspects, the wireless communication device may determine the quantity of the one or more contention slots 1105 for reducing the countdown 1106 based on a threshold number of contention credits, denoted by Umax, as shown by 1240. For example, Umax is 2. Thus, while the contention credit pool 1110 may have 5 contention credits 1112 available, the wireless communication device may use up to a maximum of 2 contention credits 1112 for reducing the countdown 1106.

In some aspects, the wireless communication device may determine the quantity of the one or more contention slots 1105 for reducing the countdown 1106 based on a quantity of CCA slots (contention slots 1105) with a successful CCA in the countdown 1106 as shown by 1250. For instance, the wireless communication device may utilize N contention credit 1112 from the contention credit pool 1110 to reduce the countdown 1106 by N+1 contention slots 1105 for each contention slots 1105 with a successful CCA. As an example, the value N may be 2. Thus, the wireless communication device may utilize 2 contention credits 1112 to reduce the countdown 1106 by 3 contention slots 1105 for each contention slot 1105 with a successful CCA in the countdown 1106 provided the contention credit pool 1110 has a sufficient number of contention credits 1112 available. In other words, the wireless communication device may utilize the contention credits 1112 in the contention credit pool 1110 progressively as contention slots 1105 are cleared by CCA. In some aspects, the value N can be hardcoded, predetermined, or specified in a wireless communication standard such as 3GPP. In some aspects, the value N can be configurable. In some instances, when the wireless communication device is a UE 115, the wireless communication device may receive a configuration for the value N from a BS 105, for example, via RRC signaling. The value N can be used to control how fast the contention credits 1112 can be utilized.

In some aspects, the wireless communication device may determine the quantity of the one or more contention slots 1105 for reducing the countdown 1106 based on a CAPC of the transmission 1120 that the wireless communication device is contending for as shown by 1260. For instance, the wireless communication device may have traffic of different CAPCs. The wireless communication device may maintain separate independent contention credit pools 1110 for different CAPCs. Additionally, different contention credit pools may have independent parametrization at 1250. For instance, each contention credit pool may be associated with a set of parameters, such as a threshold number of contention credits, a predetermine quantity of CCA slots per contention credit, a maximum contention credit pool size, and/or a contention credit lifetime, that are specific to the contention credit pool. As an example, the wireless communication device may maintain a first contention credit pool for a CAPC of class 1 and a second contention credit pool for a CAPC of class 2. The wireless communication device may utilize contention credits from the first contention credit pool to reduce the countdown 1106 when the transmission 1120 is of the CAPC class 1. Alternatively, the wireless communication device may utilize contention credits from the second contention credit pool to reduce the countdown 1106 if the transmission 1120 is of the CAPC class 2.

In some aspects, when the wireless communication device performs contention credit accumulation, for example, using the schemes 300 and/or 600 and the methods 400, 500, 700, 800, 900, and/or 1000, the wireless communication device may be allowed to maintain up to a maximum number (e.g., Kmax) of contention credits (e.g., the contention credits 312, 612) at any given time. Accordingly, in some instances, the wireless communication device may refrain from adding a contention credit to the contention credit pool when the contention credit pool is full (e.g., there is already Kmax number of contention credits in the pool). In some instance, the wireless communication device may be configured with Kmax set to 0 to disable contention credit accumulation. In some instances, when the wireless communication device is a UE 115, the wireless communication device may receive a configuration for Kmax from a BS 105, for example, via RRC signaling. The value Kmax can be used to control medium utilization fairness (e.g., how conservative or how aggressive the wireless communication device may be in channel access for sharing a medium.

In some aspects, contention credits (e.g., the contention credits 312 and/or 612) has a certain lifetime and may not be utilized after the lifetime expires. For instance, the wireless communication device may associate each contention credit with a timestamp. In some instances, the timestamp may correspond to the time when first contention credit is added to the contention credit pool. The wireless communication device may set a certain lifetime (e.g., Tmax) for the contention credits. Each contention credit may be used within a time window Tmax. For example, Tmax may be set to 2 seconds. Thus, if a contention credit is not being utilized within 2 seconds, the wireless communication device may remove the contention credit from the contention credit pool. The wireless communication device may track the lifetime of a contention credit based on the timestamp associated with the contention credit. Further, in some aspects, the wireless communication device may adjust Tmax to control how long a collected contention credit may be utilized to discount a random backoff. For example, a contention credit collected a long time ago (e.g., a few mins ago) should not be used to discount a random backoff. In some instances, when the wireless communication device is a UE 115, the wireless communication device may receive a configuration for Tmax from a BS 105, for example, via RRC signaling. The value Tmax can be used to control medium utilization fairness (e.g., how conservative or how aggressive the wireless communication device may be in channel access for sharing a medium.

In general, the wireless communication device may add contention credit(s) (accumulated during a gap period after a countdown) to a contention credit pool based on at least one of a size of the contention credit pool or a CAPC associated with an upcoming transmission (for which the countdown was performed for). The wireless communication device may remove contention credit(s) from a contention credit pool (for reducing a countdown) based on at least one of a CAPC associated with an upcoming transmission (for which the countdown was performed for) or a timestamp associated with the contention credit(s) for removal.

Figure 13:
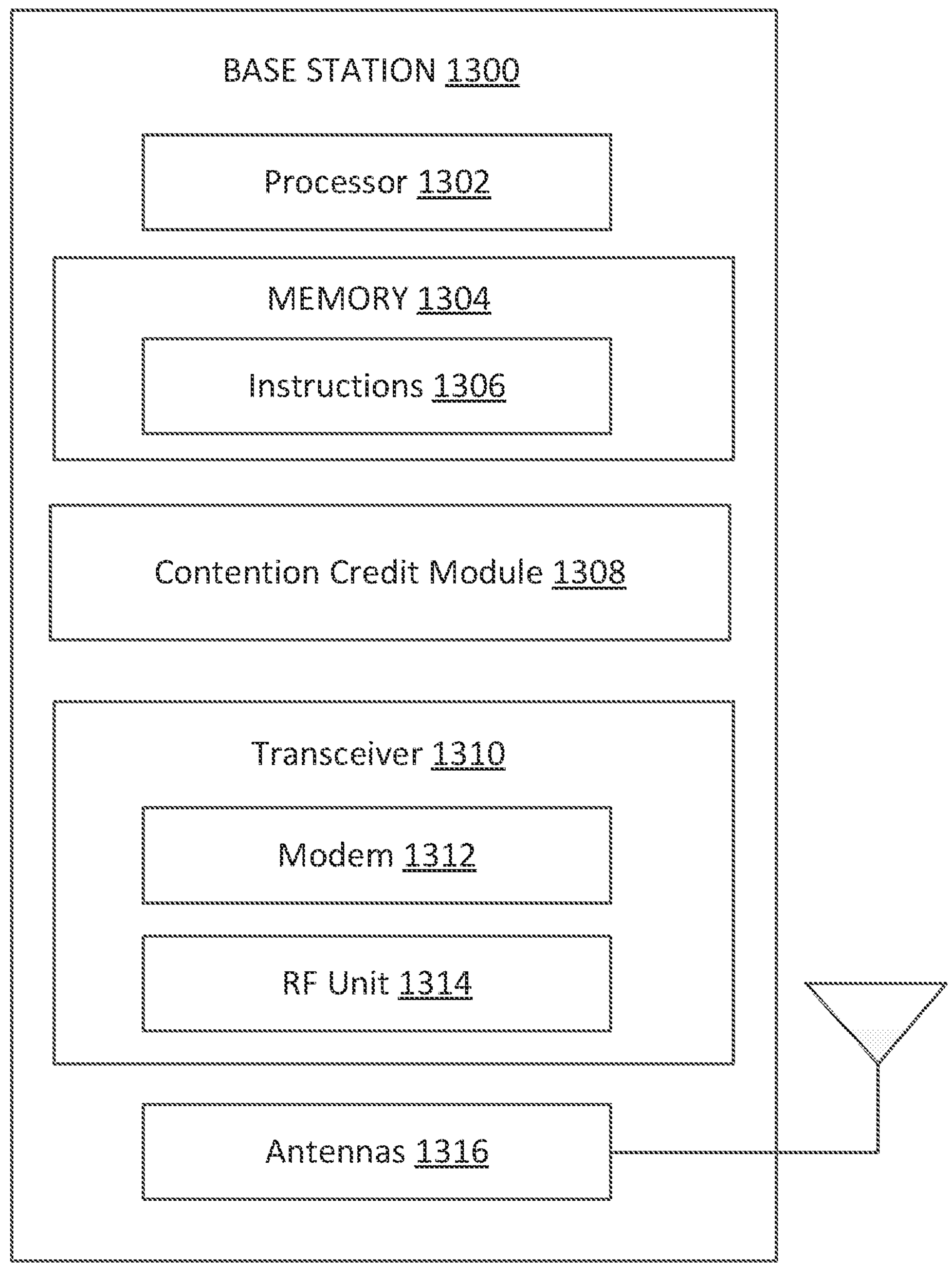
FIG. 13 illustrates a block diagram of a base station (BS) according to some aspects of the present disclosure.

FIG. 13 is a block diagram of an exemplary BS 1300 according to some aspects of the present disclosure. The BS 1300 may be a BS 105 as discussed in FIGS. 1-12. A shown, the BS 1300 may include a processor 1302, a memory 1304, a contention credit module 1308, a transceiver 1310 including a modem subsystem 1312 and a RF unit 1314, and one or more antennas 1316. These elements may be coupled with one another. The term "coupled" may refer to directly or indirectly coupled or connected to one or more intervening elements. For instance, these elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 1-12. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The contention credit module 1308 may be implemented via hardware, software, or combinations thereof. For example, the contention credit module 1308 may be implemented as a processor, circuit, and/or instructions 1306 stored in the memory 1304 and executed by the processor 1302. In some examples, the contention credit module 1308 can be integrated within the modem subsystem 1312. For example, the contention credit module 1308 can be implemented by a combination of software components (e.g., executed by a DSP or a general processor) and hardware components (e.g., logic gates and circuitry) within the modem subsystem 1312. The contention credit module 1308 may communicate with one or more components of BS 1300 to implement various aspects of the present disclosure, for example, aspects of FIGS. 1-12.

For instance, the contention credit module 1308 is configured to perform a first clear channel assessment (CCA) including a first countdown. In some aspects, the first countdown is a random backoff associated with a CAT4 LBT. In some aspects, the contention credit module 1308 is configured to perform the first CCA based on energy detection. In some aspects, the contention credit module 1308 is configured to perform a CCA in each CCA slot or contention slot (e.g., the contention slots 305, 605) within the first countdown. For instance, the contention credit module 1308 is configured to receive a signal from a shared channel in each CCA slot, determine a receive signal energy (e.g., reference signal received power (RSRP)) for each signal from the channel, and compare the received signal energy to an ED threshold. If the receive signal energy is below the ED threshold, the CCA is successful and the CCA slot is cleared (indicating the channel in clear for transmission). Otherwise, the CCA is unsuccessful (indicating the channel is occupied or busy). In some aspects, as part of performing the first CCA, the contention credit module 1308 is further to perform, during the first countdown, a category 4 listen-before-talk (CAT4 LBT), and performs, during the gap period before transmitting the first communication signal, a category 2 (CAT2 LBT).

The contention credit module 1308 is further configured to transmit, after a gap period (e.g., the gap periods 308 and/or 604) from the first countdown, a first communication signal. In some aspects, the BS 1300 may operate in a synchronous channel access mode with transmissions starting at a slot boundary. Accordingly, the contention credit module 1308 is configured to transmit the first communication signal beginning at a slot boundary (e.g., the slot boundary 301 shown in FIGS. 3, 6, and/or 11).

The contention credit module 1308 is further configured to perform a second CCA including a second countdown, for example, at a later time after the first CCA. The second countdown is a random backoff associated with another CAT4 LBT. The contention credit module 1308 is further configured to transmit, beginning before an end of the second countdown, a second communication signal based on at least a first contention credit (e.g., the contention credits 312, 612, and/or 1112) associated with the gap period.

For instance, the contention credit module 1308 is further configured to add one or more contention credits (including the first contention credit) to a contention credit pool based on the gap period, for example, as discussed above with reference to FIGS. 3-10. In some aspects, the contention credit module 1308 is configured to add the one or more contention credits to the contention credit pool further based on a size of the contention credit pool. In some aspects, the contention credit module 1308 is further configured to remove at least the first contention credit from the contention credit pool based on the transmitting the second communication signal before the end of the second countdown. Further, as part of performing the second CCA, the contention credit module 1308 is configured to reduce the second countdown by one or more CCA slots as discussed above with reference to FIGS. 11 and 12.

Further, in some aspects, the contention credit module 1308 is configured to associate the first contention credit with a timestamp. In some instances, the timestamp may correspond to the time when first contention credit is added to the contention credit pool. In some aspects, the wireless communication device may remove a second contention credit from the contention credit pool based on a timestamp associated with the second contention credit and an allowable lifetime for a contention credit.

As shown, the transceiver 1310 may include the modem subsystem 1312 and the RF unit 1314. The transceiver 1310 can be configured to communicate bi-directionally with other devices, such as the UEs 115 and/or BS 1300 and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., RRC configurations, PDSCH data, PDCCH DCI, etc.) from the modem subsystem 1312 (on outbound transmissions) or of transmissions originating from another source such as a UE 115 and/or UE 1400. The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at the BS 1300 to enable the BS 1300 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices and provide the received data messages for processing and/or demodulation at the transceiver 1310. The transceiver 1310 may provide the demodulated and decoded data (e.g., PUSCH data, PUCCH UCI, etc.) to the contention credit module 1308 for processing. The antennas 1316 may include multiple antennas of similar or different designs in order to sustain multiple transmission links.

In an aspect, the BS 1300 can include multiple transceivers 1310 implementing different RATs (e.g., NR and LTE). In an aspect, the BS 1300 can include a single transceiver 1310 implementing multiple RATs (e.g., NR and LTE). In an aspect, the transceiver 1310 can include various components, where different combinations of components can implement different RATs.

Further, in some aspects, the processor 1302 is configured to communicate with various components of the BS 1300 to perform a first clear channel assessment (CCA) including a first countdown and performing a second CCA including a second countdown. The transceiver 1310 is coupled to the processor 1302 and configured to transmit, after a gap period from the first countdown, a first communication signal and transmit, beginning before an end of the second countdown, a second communication signal based on at least a first contention credit associated with the gap period.

Figure 14:
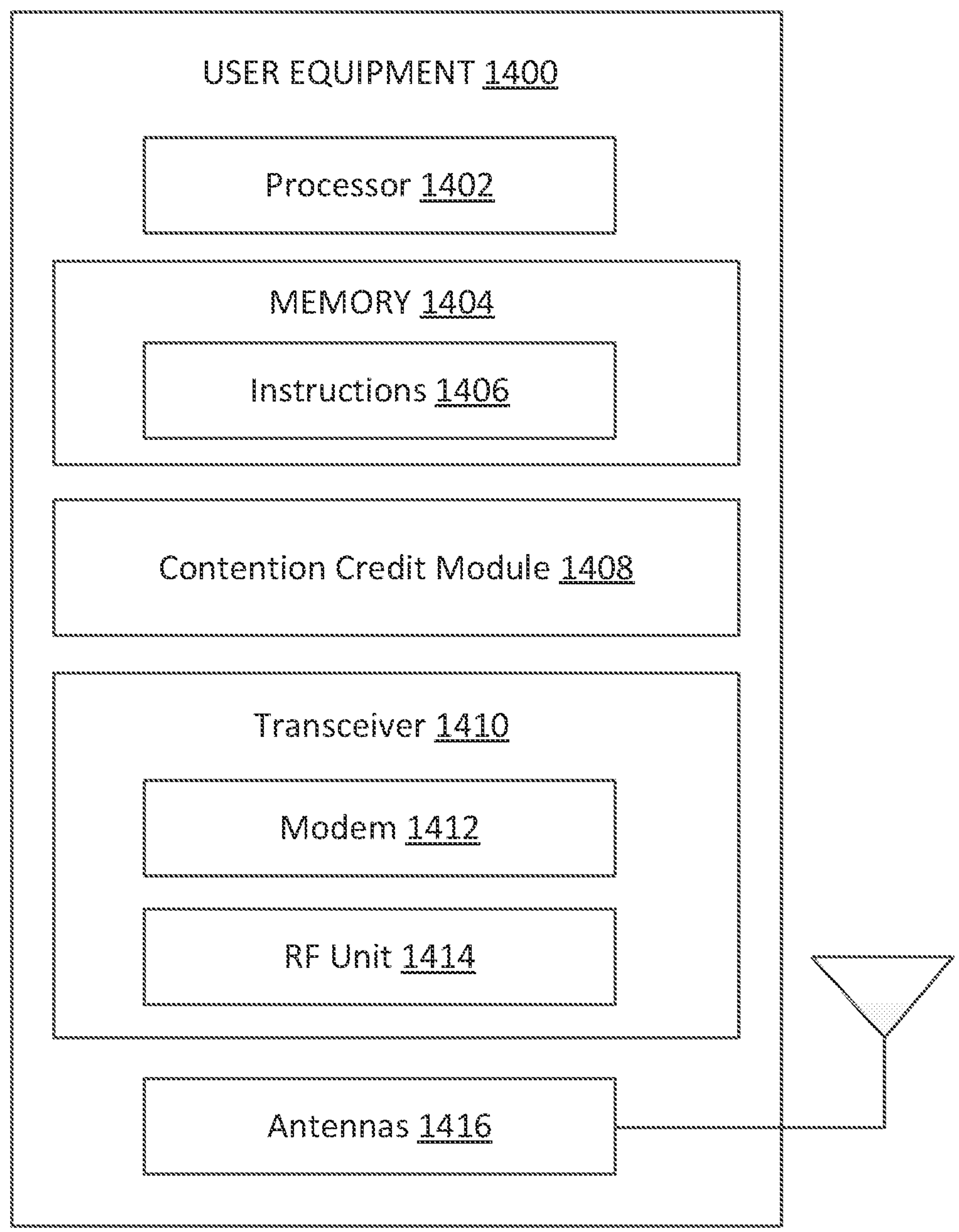
FIG. 14 illustrates a block diagram of a user equipment (UE) according to some aspects of the present disclosure.

FIG. 14 is a block diagram of an exemplary UE 1400 according to some aspects of the present disclosure. The UE 1400 may be a UE 115 as discussed above in FIGS. 1-12. As shown, the UE 1400 may include a processor 1402, a memory 1404, a contention credit module 1408, a transceiver 1410 including a modem subsystem 1412 and a radio frequency (RF) unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein with reference to a UE 115 or an anchor in connection with aspects of the present disclosure, for example, aspects of FIGS. 1-12. Instructions 1406 may also be referred to as code, which may be interpreted broadly to include any type of computer-readable statement(s) as discussed above with respect to FIG. 13.

The contention credit module 1408 may be implemented via hardware, software, or combinations thereof. For example, the contention credit module 1408 may be implemented as a processor, circuit, and/or instructions 1406 stored in the memory 1404 and executed by the processor 1402. In some aspects, the contention credit module 1408 can be integrated within the modem subsystem 1412. For example, the contention credit module 1408 can be implemented by a combination of software components (e.g., executed by a DSP or a general processor) and hardware components (e.g., logic gates and circuitry) within the modem subsystem 1412. The contention credit module 1408 may communicate with one or more components of UE 1400 to implement various aspects of the present disclosure, for example, aspects of FIGS. 1-12.

For instance, the contention credit module 1408 is configured to perform a first clear channel assessment (CCA) including a first countdown. In some aspects, the first countdown is a random backoff associated with a CAT4 LBT. In some aspects, the contention credit module 1408 is configured to perform the first CCA based on energy detection. In some aspects, the contention credit module 1408 is configured to perform a CCA in each CCA slot or contention slot (e.g., the contention slots 305, 605) within the first countdown. For instance, the contention credit module 1408 is configured to receive a signal from a shared channel in each CCA slot, determine a receive signal energy (e.g., RSRP) for each signal from the channel, and compare the received signal energy to an ED threshold. If the receive signal energy is below the ED threshold, the CCA is successful and the CCA slot is cleared (indicating the channel in clear for transmission). Otherwise, the CCA is unsuccessful (indicating the channel is occupied or busy). In some aspects, as part of performing the first CCA, the contention credit module 1408 is further to perform, during the first countdown, a category 4 listen-before-talk (CAT4 LBT), and performs, during the gap period before transmitting the first communication signal, a category 2 (CAT2 LBT).

The contention credit module 1408 is further configured to transmit, after a gap period (e.g., the gap periods 308 and/or 604) from the first countdown, a first communication signal. In some aspects, the BS 1300 may operate in a synchronous channel access mode with transmissions starting a slot boundary. Accordingly, the contention credit module 1408 is configured to transmit the first communication signal beginning at a slot boundary (e.g., the slot boundary 301 shown in FIGS. 3, 6, and/or 11).

The contention credit module 1408 is further configured to perform a second CCA including a second countdown, for example, at a later time after the first CCA. The second countdown is a random backoff associated with another CAT4 LBT. The contention credit module 1408 is further configured to transmit, beginning before an end of the second countdown, a second communication signal based on at least a first contention credit (e.g., the contention credits 312, 612, and/or 1112) associated with the gap period.

For instance, the contention credit module 1408 is further configured to add one or more contention credits (including the first contention credit) to a contention credit pool based on the gap period, for example, as discussed above with reference to FIGS. 3-10. In some aspects, the contention credit module 1408 is configured to add the one or more contention credits to the contention credit pool further based on a size of the contention credit pool. In some aspects, the contention credit module 1408 is further configured to remove at least the first contention credit from the contention credit pool based on the transmitting the second communication signal before the end of the second countdown. Further, as part of performing the second CCA, the contention credit module 1408 is configured to reduce the second countdown by one or more CCA slots as discussed above with reference to FIGS. 11-12.

Further, in some aspects, the contention credit module 1408 is configured to associate the first contention credit with a timestamp. In some instances, the timestamp may correspond to the time when first contention credit is added to the contention credit pool. In some aspects, the wireless communication device may remove a second contention credit from the contention credit pool based on a timestamp associated with the second contention credit and an allowable lifetime for a contention credit.

As shown, the transceiver 1410 may include the modem subsystem 1412 and the RF unit 1414. The transceiver 1410 can be configured to communicate bi-directionally with other devices, such as the BSs 105 and 1300. The modem subsystem 1412 may be configured to modulate and/or encode the data from the memory 1404 and/or the contention credit module 1408 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., PUSCH data, PUCCH UCI, sidelink transmissions, etc.) from the modem subsystem 1412 (on outbound transmissions) or of transmissions originating from another source such as a UE 115, a BS 105, or an anchor. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the UE 1400 to enable the UE 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., RRC configurations, PDSCH data, PDCCH DCI, etc.) to the contention credit module 1408 for processing. The antennas 1416 may include multiple antennas of similar or different designs in order to sustain multiple transmission links.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

Further, in some aspects, the processor 1402 is configured to communicate with various components of the UE 1400 to perform a first clear channel assessment (CCA) including a first countdown and performing a second CCA including a second countdown. The transceiver 1410 is coupled to the processor 1402 and configured to transmit, after a gap period from the first countdown, a first communication signal and transmit, beginning before an end of the second countdown, a second communication signal based on at least a first contention credit associated with the gap period.

Figure 15:
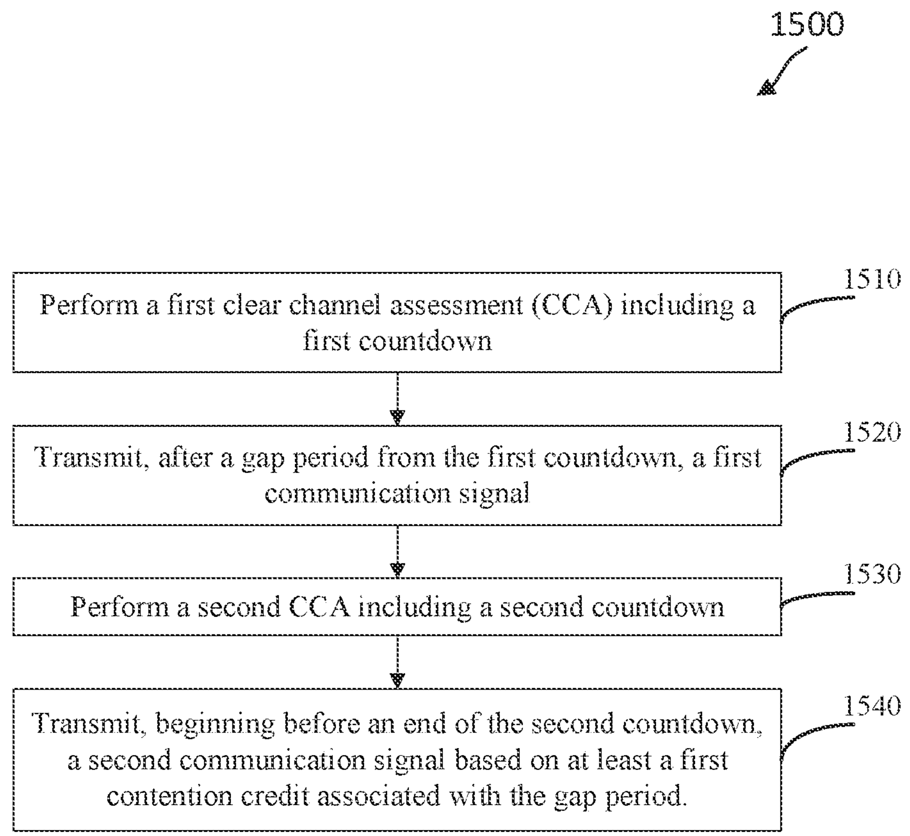
FIG. 15 is a flow diagram of a wireless communication method according to some aspects of the present disclosure.

FIG. 15 is a flow diagram illustrating a wireless communication method 1500 according to some aspects of the present disclosure. Aspects of the method 1500 can be executed by a computing device (e.g., a processor, processing circuit, and/or other suitable component) of a wireless communication device or other suitable means for performing the blocks. For example, a wireless communication device, such as the UE 115 or the UE 1400, may utilize one or more components, such as the processor 1402, the memory 1404, the contention credit module 1408, the transceiver 1410, the modem 1412, the RF unit 1414, and the one or more antennas 1416, to execute the blocks of method 1500. In another example, a wireless communication device, such as the BS 105 or the BS 1300, may utilize one or more components, such as the processor 1302, the memory 1304, the contention credit module 1308, the transceiver 1310, the modem 1312, the RF unit 1314, and the one or more antennas 1316, to execute the blocks of method 1500. The method 1500 may employ similar mechanisms as described in FIGS. 1-12. As illustrated, the method 1500 includes a number of enumerated blocks, but aspects of the method 1500 may include additional blocks before, after, and in between the enumerated blocks. In some aspects, one or more of the enumerated blocks may be omitted or performed in a different order.

At block 1510, a wireless communication device (e.g., the UE 115, 1400, or the BS 105, 1300) performs a first clear channel assessment (CCA) including a first countdown. In some aspects, the first countdown is a random backoff associated with a CAT4 LBT. In some aspects, the wireless communication device may perform the first CCA based on energy detection. In some aspects, the wireless communication device may perform a CCA in each CCA slot or contention slot (e.g., the contention slots 305, 605) within the first countdown. For instance, the wireless communication device may receive a signal from a shared channel in each CCA slot, determine a receive signal energy (e.g., RSRP) for each signal from the channel, and compare the received signal energy to an ED threshold. If the receive signal energy is below the ED threshold, the CCA is successful and the CCA slot is cleared (indicating the channel in clear for transmission). Otherwise, the CCA is unsuccessful (indicating the channel is occupied or busy). In some aspects, the wireless communication device may correspond to a BS 105 or BS 1300, where means for performing the functionality of block 1510 can, but not necessarily, include, for example, contention credit module 1308, transceiver 1310, antennas 1316, processor 1302, and/or memory 1304 with reference to FIG. 13. In some aspects, the wireless communication device may correspond to a UE 115 or UE 1400, where means for performing the functionality of block 1510 can, but not necessarily, include, for example, contention credit module 1408, transceiver 1410, antennas 1416, processor 1402, and/or memory 1404 with reference to FIG. 14.

At block 1520, the wireless communication device transmits, after a gap period (e.g., the gap periods 308 and/or 604) from the first countdown, a first communication signal. In some aspects, the wireless communication device may operate in a synchronous channel access mode with transmissions starting a slot boundary. Accordingly, the wireless communication device may transmit the first communication signal beginning at a slot boundary (e.g., the slot boundary 301 shown in FIGS. 3, 6, and/or 11). In some aspects, the wireless communication device may correspond to a BS 105 or BS 1300, where means for performing the functionality of block 1520 can, but not necessarily, include, for example, contention credit module 1308, transceiver 1310, antennas 1316, processor 1302, and/or memory 1304 with reference to FIG. 13. In some aspects, the wireless communication device may correspond to a UE 115 or UE 1400, where means for performing the functionality of block 1520 can, but not necessarily, include, for example, contention credit module 1408, transceiver 1410, antennas 1416, processor 1402, and/or memory 1404 with reference to FIG. 14.

At block 1530, the wireless communication device performs a second CCA including a second countdown. The second countdown is a random backoff associated with another CAT4 LBT. The wireless communication device may perform the second CCA using similar mechanisms as at block 1510. In some aspects, the wireless communication device may correspond to a BS 105 or BS 1300, where means for performing the functionality of block 1530 can, but not necessarily, include, for example, contention credit module 1308, transceiver 1310, antennas 1316, processor 1302, and/or memory 1304 with reference to FIG. 13. In some aspects, the wireless communication device may correspond to a UE 115 or UE 1400, where means for performing the functionality of block 1530 can, but not necessarily, include, for example, contention credit module 1408, transceiver 1410, antennas 1416, processor 1402, and/or memory 1404 with reference to FIG. 14.

At block 1540, the wireless communication device transmits, beginning before an end of the second countdown, a second communication signal based on at least a first contention credit (e.g., the contention credits 312, 612, and/or 1112) associated with the gap period. In some aspects, the wireless communication device may also transmit the second communication signal beginning at a slot boundary (e.g., the slot boundary 301 shown in FIGS. 3, 6, and/or 11). That is, the wireless communication device may utilize the at least the first contention credit to be "in time" to start the transmission of the second communication signal at the slot boundary before the end of the second countdown. In some aspects, the wireless communication device may correspond to a BS 105 or BS 1300, where means for performing the functionality of block 1540 can, but not necessarily, include, for example, contention credit module 1308, transceiver 1310, antennas 1316, processor 1302, and/or memory 1304 with reference to FIG. 13. In some aspects, the wireless communication device may correspond to a UE 115 or UE 1400, where means for performing the functionality of block 1540 can, but not necessarily, include, for example, contention credit module 1408, transceiver 1410, antennas 1416, processor 1402, and/or memory 1404 with reference to FIG. 14.

In some aspects, the wireless communication device may add one or more contention credits to a contention credit pool based on the gap period, where the one or more contention credits includes the first contention credit. The wireless communication device may further remove at least the first contention credit from the contention credit pool based on the transmitting the second communication signal before the end of the second countdown. For instance, the wireless communication device may track a number of contention credits in the contention credit pool by utilizing a counter. The wireless communication device may add the first contention credit to the contention credit pool (based on the gap period) by incrementing the counter, and may remove the first contention credit from the contention credit pool after utilizing the first contention credit (to transmit the second communication signal before the end of the second countdown) by decrementing the counter. In some aspects, a quantity of the one or more contention credits is further based on a number of CCA slots in the gap period. In some aspects, a quantity of the one or more contention credits is based on a number of CCA slots with a successful CCA in the gap period. For instance, the wireless communication device may continue to perform a CCA during the gap period. More specifically, the wireless communication device may perform a CCA in each CCA slot within the gap period, and may determine the quantity of the one or more contention credits based on the number of CCA slots with the successful CCA in the gap period.

In some aspects, the wireless communication device may further perform a third CCA including a third countdown. The third countdown is a random backoff associated with a CAT4 LBT. The wireless communication device may detect a CCA failure in a CCA slot within a second gap period after an end of the third countdown and before a next slot boundary (where a transmission may start). In this regard, the wireless communication device may continue to perform CCA during the second gap period. More specifically, the wireless communication device may perform a CCA in each CCA slot within the second gap period. In one aspect, upon detecting the CCA failure, the wireless communication device may add one or more second contention credits to the contention credit pool based on CCA slots with a successful CCA in the second gap period before the CCA failure. Thus, a quantity of the one or more second contention credits is based on a number of the CCA slots with the successful CCA. In other words, the wireless communication device may add the one or more second contention credits (based on the CCA slots with the successful CCA before the CCA failure) to the contention credit pool irrespective of detecting the CCA failure in the second gap period, for example, as discussed above with reference to FIGS. 4 and/or 9. In another aspect, upon detecting the CCA failure, the wireless communication device may refrain, based on the CCA failure, from adding a second contention credit to the contention credit pool. In other words, upon detecting the CCA failure, the wireless communication device may discard any contention credits that were accumulated during the second gap period before the CCA failure, for example, as discussed above with reference to FIG. 5 and/or 10.

In some aspects, as part of performing the first CCA at block 1510, the wireless communication device performs, during the first countdown, a category 4 listen-before-talk (CAT4 LBT), and performs, during the gap period before transmitting the first communication signal, a category 2 (CAT2 LBT). Both the CAT4 LBT and the CAT2 LBT may be based on energy detection. The CAT4 LBT may include a CCA (channel signal measurement and a threshold comparison) for each CCA slot in the first countdown. The CAT2 LBT includes a one-shot channel signal energy measurement (a single measurement), for example, over a duration of about 25 μs, and an ED threshold comparison. The wireless communication device may determine a quantity of the one or more contention credits based on at least one of the gap period or a duration of a CCA slot. For instance, the wireless communication device may determine a number of CCA slots the gap period that may include as discussed above with reference to FIGS. 6-10. In some aspects, the wireless communication device may add the one or more contention credit to the contention credit pool further based on the CAT2 LBT being successful, for example, as discussed above with reference to FIG. 8 and/or 10. In some aspects, the quantity of the one or more contention credits is further based on a number of CCA slots with a successful CCA in the gap period before the CAT2 LBT, for example, as discussed above with reference to FIG. 10. For instance, the wireless communication device may continue to perform a CCA during the gap period. More specifically, the wireless communication device may perform a CCA in each CCA slot within the gap period, and may determine the quantity of the one or more contention credits based on the number of CCA slots with the successful CCA in the gap period. In some aspects, the quantity of the one or more contention credits is further based on a duration of the CAT2 LBT. For instance, each CCA slot may have a duration of about 9 μs, and the CAT2 LBT may be over a duration of about 25 μs. Accordingly, the one or more contention credits may correspond to the number of CCA slots with the successful CCA in the gap period plus 2 additional contention credits (e.g., 2=floor (25 μs/9 μs)) from the CCA during the CAT2 LBT, for example, as in equation (2) discussed above with reference to FIG. 9 and/or 10.

In some aspects, as part of performing the second CCA at block 1530, the wireless communication device reduces the second countdown by one or more CCA slots, where a quantity of the one or more CCA slots is based on a quantity of contention credits available in the contention credit pool. For instance, the wireless communication device may utilize one available contention credit to reduce the second countdown by one CCA slot. In some aspects, the quantity of the one or more CCA slots may correspond to all contention credits available in the contention credit pool. In other words, the wireless communication device may utilize all available contention credits in the contention credit pool to reduce the second countdown. In some aspects, the quantity of the one or more CCA slots for reducing the second countdown is further based on a threshold. The threshold may be a maximum number of contention credits that the wireless communication device may utilize per countdown. In some aspects, the quantity of the one or more CCA slots for reducing the second countdown is further based on a number of CCA slots associated with a successful CCA in the first countdown. In some aspects, the quantity of the one or more CCA slots for reducing the second countdown is further based on a predetermine quantity of CCA slots per contention credit. For instance, for each CCA slot with a successful CCA in the gap period, the wireless communication device may utilize N contention credits for reducing the second countdown. In some aspects, the quantity of the one or more CCA slots for reducing the second countdown is further based on a channel access priority class (CAPC) associated with the second communication signal. For instance, the wireless communication device may have traffic of different CAPCs. The wireless communication device may maintain separate independent contention credit pools for different CAPCs. Additionally, different contention credit pools may have independent parametrization, such as a threshold number of contention credits, a predetermine quantity of CCA slots per contention credit, a maximum contention credit pool size, and/or a contention credit lifetime. Accordingly, the wireless communication device may reduce the second countdown by utilizing contention credits from a contention credit pool corresponding to the CAPC of the second communication signal and/or in accordance with parameters defined for the corresponding CAPC.

In some aspects, the wireless communication device may add the one or more contention credits to the contention credit pool further based on at least one a size of the contention credit pool or a CAPC associated with the first communication signal. Further, the wireless communication device may remove the first contention credit from the contention credit pool further based on a CAPC associated with the second communication signal. For example, the first communication signal and the second communication signal may be associated with the same CAPC, and thus contention credit(s) accumulated based on the gap period before the first communication signal can be used to discount or reduce the second countdown for the second communication signal.

In some aspects, the wireless communication device may further associate the first contention credit with a timestamp. In some instances, the timestamp may correspond to the time when first contention credit is added to the contention credit pool. In some aspects, the wireless communication device may remove a second contention credit from the contention credit pool based on a timestamp associated with the second contention credit. For instance, if the second contention credit has been stored in the contention credit pool for a duration longer than an allowable contention credit lifetime, the wireless communication device may remove the second contention credit from the contention credit pool.

Further aspects of the present disclosure include the following:

1. A method of wireless communication performed by a wireless communication device, the method comprising:
 performing a first clear channel assessment (CCA) including a first countdown;
 transmitting, after a gap period from the first countdown, a first communication signal;
 performing a second CCA including a second countdown; and
 transmitting, beginning before an end of the second countdown, a second communication signal based on at least a first contention credit associated with the gap period.
2. The method of aspect 1, wherein the transmitting the first communication signal is based on a slot boundary.
3. The method of any of aspects 1-2, further comprising:
 adding, based on the gap period, one or more contention credits to a contention credit pool, the one or more contention credits including the first contention credit; and
 removing the first contention credit from the contention credit pool based on the transmitting the second communication signal before the end of the second countdown.
4. The method of aspect 3, wherein a quantity of the one or more contention credits is based on a number of CCA slots in the gap period.
5. The method of aspect 3, wherein a quantity of the one or more contention credits is based on a number of CCA slots with a successful CCA in the gap period.
6. The method of any of aspects 1-5, further comprising:
 performing a third CCA including a third countdown;
 detecting a CCA failure in a CCA slot within a second gap period after an end of the third countdown and before a next slot boundary; and
 adding one or more second contention credits to the contention credit pool, wherein a quantity of the one or more second contention credits is based on a number of CCA slots with a successful CCA in the second gap period before the CCA slot.
7. The method of any of aspects 1-5, further comprising:
 performing a third CCA including a third countdown;
 detecting a CCA failure in a CCA slot within a second gap period after an end of the third countdown and before a next slot boundary; and
 refraining, based on the CCA failure, from adding a second contention credit to the contention credit pool.
8. The method of any of aspects 1-4, wherein the performing the first CCA comprises:
 performing, during the first countdown, a category 4 (CAT4) listen-before-talk (LBT); and
 performing, during the gap period before transmitting the first communication signal, a category 2 (CAT2) LBT, and
 wherein a quantity of the one or more contention credits is based on at least one of the gap period or a duration of a CCA slot.
9. The method of aspect 8, wherein the adding the one or more contention credits to the contention credit pool is further based on the CAT2 LBT being successful.
10. The method of aspect 8, wherein the quantity of the one or more contention credits is further based on a number of CCA slots with a successful CCA in the gap period before the CAT2 LBT.
11. The method of aspect 8, wherein the quantity of the one or more contention credits is further based on a duration of the CAT2 LBT.
12. The method of any of aspects 1-5 or 8-11, further comprising:
 performing a category 4 (CAT4) listen-before-talk (LBT);
 performing, during a second gap period after the CAT4 LBT and before a next slot boundary, a category 2 (CAT2) LBT;
 determining that the CAT2 LBT is unsuccessful; and
 adding one or more second contention credits to the contention credit pool, wherein a quantity of the one or more second contention credits is based on at least one of the second gap period or a duration of a CCA slot.
13. The method of any of aspects 1-5 or 8-11, further comprising:
 performing a category 4 (CAT4) listen-before-talk (LBT);
 performing, during a second gap period after the CAT4 LBT and before a next slot boundary, a category 2 (CAT2) LBT;
 determining that the CAT2 LBT is unsuccessful; and
 refraining, based on the CAT2 LBT being unsuccessful, from adding a second contention credits to the contention credit pool.
14. The method of any of aspects 1-13, wherein the performing the second CCA comprises:
 reducing the second countdown by one or more CCA slots, wherein a quantity of the one or more CCA slots for reducing the second countdown is based on a quantity of contention credits available in the contention credit pool.
15. The method of aspect 14, wherein the quantity of the one or more CCA slots for reducing the second countdown is based on a threshold.
16. The method of aspect 14, wherein the quantity of the one or more CCA slots for reducing the second countdown is based on a number of CCA slots associated with a successful CCA in the second countdown.
17. The method of aspect 14, wherein the quantity of the one or more CCA slots for reducing the second countdown is based on a predetermined quantity of CCA slots per contention credit.
18. The method of aspect 14, wherein the quantity of the one or more CCA slots for reducing the second countdown is based on a channel access priority class (CAPC).
19. The method of any of aspects 1-18, wherein the adding the one or more contention credits to the contention credit pool is further based on at least one of a size of the contention credit pool or a channel access priority class (CAPC).
20. The method of any of aspects 1-18, further comprising:
 removing a second contention credit from the contention credit pool based on at least one of a timestamp associated with the second contention credit or a channel access priority class (CAPC).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a wireless communication device, the method comprising:

performing a first clear channel assessment (CCA) including a first countdown;

adding, based on a gap period between an end of the first countdown and a first slot boundary, one or more contention credits to a contention credit pool, the one or more contention credits including a first contention credit;

performing, during the gap period, a category 2 (CAT2) LBT;

adding, based on a value proportional to a duration of the CAT2 LBT, one or more additional contention credits to the contention credit pool;

transmitting, after the gap period, a first communication signal at the first slot boundary;

performing a second CCA including a second countdown; and transmitting, beginning at a second slot boundary and before an end of the second countdown, a second communication signal based on at least a quantity of contention credits available in the contention credit pool.

2. The method of claim 1, further comprising:

removing the first contention credit from the contention credit pool based on the transmitting the second communication signal before the end of the second countdown.

3. The method of claim 2, wherein a quantity of the one or more contention credits is based on a number of CCA slots in the gap period.

4. The method of claim 2, wherein a quantity of the one or more contention credits is based on a number of CCA slots with a successful CCA in the gap period.

5. The method of claim 2, further comprising:

performing a third CCA including a third countdown;

detecting a CCA failure in a CCA slot within a second gap period after an end of the third countdown and before a next slot boundary; and adding one or more second contention credits to the contention credit pool, wherein a quantity of the one or more second contention credits is based on a number of CCA slots with a successful CCA in the second gap period before the CCA slot.

6. The method of claim 2, further comprising:

performing a third CCA including a third countdown;

detecting a CCA failure in a CCA slot within a second gap period after an end of the third countdown and before a next slot boundary; and refraining, based on the CCA failure, from adding a second contention credit to the contention credit pool.

7. The method of claim 2, wherein the performing the first CCA comprises:

performing, during the first countdown, a category 4 (CAT4) listen-before-talk (LBT);

wherein a quantity of the one or more contention credits is based on at least one of the gap period or a duration of a CCA slot.

8. The method of claim 1, wherein the adding the one or more contention credits to the contention credit pool is further based on the CAT2 LBT being successful.

9. The method of claim 7, wherein the quantity of the one or more contention credits is further based on a number of CCA slots with a successful CCA in the gap period before the CAT2 LBT.

10. The method of claim 2, further comprising:

performing a category 4 (CAT4) listen-before-talk (LBT);

performing, during a second gap period after the CAT4 LBT and before a next slot boundary, a second CAT2 LBT;

determining that the second CAT2 LBT is unsuccessful; and adding one or more second contention credits to the contention credit pool, wherein a quantity of the one or more second contention credits is based on at least one of the second gap period or a duration of a CCA slot.

11. The method of claim 2, further comprising:

performing a category 4 (CAT4) listen-before-talk (LBT);

performing, during a second gap period after the CAT4 LBT and before a next slot boundary, a second CAT2 LBT;

determining that the second CAT2 LBT is unsuccessful; and refraining, based on the second CAT2 LBT being unsuccessful, from adding a second contention credit to the contention credit pool.

12. The method of claim 2, wherein the performing the second CCA comprises:

reducing the second countdown by one or more CCA slots, wherein a quantity of the one or more CCA slots for reducing the second countdown is based on the quantity of contention credits available in the contention credit pool.

13. The method of claim 12, wherein the quantity of the one or more CCA slots for reducing the second countdown is based on a threshold.

14. The method of claim 12, wherein the quantity of the one or more CCA slots for reducing the second countdown is based on a number of CCA slots associated with a successful CCA in the second countdown.

15. The method of claim 12, wherein the quantity of the one or more CCA slots for reducing the second countdown is based on a predetermined quantity of CCA slots per contention credit.

16. The method of claim 12, wherein the quantity of the one or more CCA slots for reducing the second countdown is based on a channel access priority class (CAPC).

17. The method of claim 2, wherein the adding the one or more contention credits to the contention credit pool is further based on at least one of a size of the contention credit pool or a channel access priority class (CAPC).

18. The method of claim 2, further comprising:

removing a second contention credit from the contention credit pool based on at least one of a timestamp associated with the second contention credit or a channel access priority class (CAPC).

19. A wireless communication device comprising:

one or more memories; and one or more processors coupled to the one or more memories, the one or more memories storing instructions that are executable by the one or more processors, individually or in any combination, to cause the wireless communication device to:

perform a first clear channel assessment (CCA) including a first countdown;

add, based on a gap period between an end of the first countdown and a first slot boundary, one or more contention credits to a contention credit pool, the one or more contention credits including a first contention credit;

perform, during the gap period, a category 2 (CAT2) LBT;

add, based on a value proportional to a duration of the CAT2 LBT, one or more additional contention credits to the contention credit pool;

transmit, after the gap period, a first communication signal at the first slot boundary;

perform a second CCA including a second countdown; and transmit, beginning at a second slot boundary and before an end of the second countdown, a second communication signal based on at least a quantity of contention credits available in the contention credit pool.

20. The wireless communication device of claim 19, wherein the one or more processors are further configured to cause the wireless communication device to:

remove the first contention credit from the contention credit pool based on the transmitting the second communication signal before the end of the second countdown.

21. The wireless communication device of claim 20, wherein a quantity of the one or more contention credits is based on a number of CCA slots in the gap period.

22. The wireless communication device of claim 20, wherein a quantity of the one or more contention credits is based on a number of CCA slots with a successful CCA in the gap period.

23. The wireless communication device of claim 20, wherein the one or more processors are further configured to cause the wireless communication device processor configured to perform the first CCA is configured to:

perform, during the first countdown, a category 4 (CAT4) listen-before-talk (LBT), wherein a quantity of the one or more contention credits is based on at least one of the gap period or a duration of a CCA slot.

24. The wireless communication device of claim 20, wherein the one or more processors are further configured to cause the wireless communication device to:

reduce the second countdown by one or more CCA slots, wherein a quantity of the one or more CCA slots is based on at least one of a quantity of contention credits available in the contention credit pool.

25. A non-transitory computer-readable medium having program code recorded thereon, the program code comprising:

code for causing a wireless communication device to perform a first clear channel assessment (CCA) including a first countdown;

code for causing the wireless communication device to add, based on a gap period between an end of the first countdown and a first slot boundary, one or more contention credits to a contention credit pool, the one or more contention credits including a first contention credit;

code for causing the wireless communication device to perform, during the gap period, a category 2 (CAT2) LBT;

code for causing the wireless communication device to add, based on a value proportional to a duration of the CAT2 LBT, one or more additional contention credits to the contention credit pool;

code for causing the wireless communication device to transmit, after the gap period, a first communication signal at the first slot boundary;

code for causing the wireless communication device to perform a second CCA including a second countdown; and code for causing the wireless communication device to transmit, beginning at a second slot boundary and before an end of the second countdown, a second communication signal based on at least a quantity of contention credits available in the contention credit pool.

26. A wireless communication device comprising:

means for performing a first clear channel assessment (CCA) including a first countdown;

means for adding, based on a gap period between an end of the first countdown and a first slot boundary, one or more contention credits to a contention credit pool, the one or more contention credits including a first contention credit;

means for performing, during the gap period, a category 2 (CAT2) LBT;

means for adding, based on a value proportional to a duration of the CAT2 LBT, one or more additional contention credits to the contention credit pool;

means for transmitting, after the gap period, a first communication signal at the first slot boundary;

means for performing a second CCA including a second countdown; and means for transmitting, beginning at a second slot boundary and before an end of the second countdown, a second communication signal based on at least a quantity of contention credits available in the contention credit pool.

* * * * *